United States Patent
Aili et al.

(10) Patent No.: US 10,068,174 B2
(45) Date of Patent: Sep. 4, 2018

(54) HYBRID APPROACH FOR DEVELOPING, OPTIMIZING, AND EXECUTING CONVERSATIONAL INTERACTION APPLICATIONS

(71) Applicant: Artifical Solutions Iberia S.L., Barcelona (ES)

(72) Inventors: Eric Aili, Huddinge (SE); Rebecca Jonsson, Barcelona (ES); Siem Uittenhout, Utrecht (NL); Gareth Walters, Cheltenham (GB); Andreas Wieweg, Stockholm (SE); Lucas Willering, Utrecht (NL)

(73) Assignee: Artifical Solutions Iberia S.L., Barcelona (ES)

( * ) Notice: Subject to any disclaimer, the term of this patent is extended or adjusted under 35 U.S.C. 154(b) by 0 days.

(21) Appl. No.: 15/846,044

(22) Filed: Dec. 18, 2017

(65) Prior Publication Data
US 2018/0089572 A1 Mar. 29, 2018

Related U.S. Application Data

(63) Continuation-in-part of application No. 14/711,742, filed on May 13, 2015, which is a continuation-in-part
(Continued)

(51) Int. Cl.
*G06F 17/30* (2006.01)
*G06N 5/02* (2006.01)
(Continued)

(52) U.S. Cl.
CPC .......... *G06N 5/022* (2013.01); *G06F 17/241* (2013.01); *G06F 17/2785* (2013.01); *G06F 17/30401* (2013.01); *G06N 99/005* (2013.01)

(58) Field of Classification Search
CPC .................................................. G06F 17/30401
See application file for complete search history.

(56) References Cited

U.S. PATENT DOCUMENTS

| 9,336,772 B1 | 5/2016 | Salvador et al. |
| 2015/0081279 A1 | 3/2015 | Suleman et al. |

(Continued)

OTHER PUBLICATIONS

"Integrated Development Environments for Natural Language Processing" by Text Analysis International, Inc., 2001. (Year: 2001).*

*Primary Examiner* — Grace Park
(74) *Attorney, Agent, or Firm* — Galvin Patent Law LLC; Brain R. Galvin

(57) ABSTRACT

A system for hybrid approach to natural language understanding is provided, comprising a machine learning configured to create a new natural language understanding model from user-provided examples, and provide a natural language understanding model dataset to other components of the system; an integrated development environment configured to retrieve the natural language understanding model dataset, and publish a hybrid runtime solution; and an interaction engine configured to: retrieve the hybrid runtime solution, receive a natural language input, and process the natural language input and generate a log dataset; wherein, the log dataset may be used to retrain and improve existing models.

20 Claims, 22 Drawing Sheets

Related U.S. Application Data of application No. 13/565,790, filed on Aug. 2, 2012, now Pat. No. 8,346,563.

(60) Provisional application No. 62/435,700, filed on Dec. 16, 2016, provisional application No. 61/992,728, filed on May 13, 2014.

(51) Int. Cl.
*G06N 99/00* (2010.01)
*G06F 17/27* (2006.01)
*G06F 17/24* (2006.01)

(56) References Cited

U.S. PATENT DOCUMENTS

| | | |
|---|---|---|
| 2016/0260029 A1 | 9/2016 | Gelfenbeyn et al. |
| 2017/0293681 A1 | 10/2017 | Blandin et al. |

* cited by examiner

| | |
|---|---|
| 1245 | Can I change my intercontinental flight? |
| 1246 | Where can I check-in? |
| 1247 | How can I book a multicity trip |
| 1248 | How long does it take for points to be credited to my account? I flew 4 weeks ago on United Airlines... |
| 1249 | I want to change my ticket |
| 1250 | How can I register missing CarryPoints? |
| 1251 | How can I contract CarryMe Sales? |
| 1252 | Phone_CarryPoints_43 |
| 1253 | I have an enquiry about my booking |
| 1254 | Can I talk to a live agent? |
| 1255 | hospitalet |
| 1256 | How do I select a seat? |
| 1257 | I want to bring my pet, is that possible? |
| 1258 | How do I select a seat? |
| 1259 | what is the number |
| 1260 | How can I register missing CarryPoints? |
| 1261 | How can I contact CarryMe sales? |
| 1262 | Can I talk to a live agent? |
| 1263 | booking without logged in |

Fig. 13

| baggage.syn allowance | negation.rec flight | | | |
| --- | --- | --- | --- | --- |
| negation.rec find | when airport | how much bring | months list any_number | |
| negation.rec booking | pay creditcard.syn | how much baggage.syn bring | fly cities.list | find booking |
| order carrypoints | print boarding pass | carryme flight | question.syn baggage.syn | points trip |
| | | seat flight | forgotten order new | order new |
| | | negation.rec check | forgotten password | charge baggage.syn |
| | | lost baggage.syn | lost login | charge excess baggage |
| | | | how many points trip | book ticket |
| | | | how many trip | use points |
| | | | | travel baggage.syn |

| Input | Class | Actions |
|---|---|---|
| can you make a phone call? (phone me please!, Please me a phone call for me) | call contact (98%) | ✓ ▶ |
| what is the battery status of this device (show my battery status, what's my battery stat) | take a photo (96%) | ✓ ▶ |
| please switch the Bluetooth off (change my Bluetooth setting to off) | modify phone settings (76%) | ✓ ▶ |
| change to airplane mode (switch on airplane mode for me) | modify phone settings (74%) | ✓ ▶ |
| would you kindly open the camera (could you please turn my camera on) | take a photo (67%) | ✓ ▶ |
| can you please give me a call? (please give me a call at 12, I would like you to call me later) | call contact (24%) | ✓ ▶ |

| Input | Class | Actions |
|---|---|---|
| can you make a phone call? (phone me please!, Please me a phone call for me) | call contact (98%) | ✓ ▶ |
| what is the battery status of this device (show my battery status, what's my battery stat) | take a photo (96%) | ✓ ▶ |
| please switch the Bluetooth off (change my Bluetooth setting to off) | modify phone settings (76%) | ✓ ▶ |
| change to airplane mode (switch on airplane mode for me) | modify phone settings (74%) | ✓ ▶ |
| would you kindly open the camera (could you please turn my camera on) | take a photo (67%) modify phone settings (76%) | ✓ ▶ |
| can you please give me a call? (please give me a call at 12, I would like you to call me later) | set alarm (8%) | ✓ ▶ |

| Input | Class | Actions |
|---|---|---|
| can you make a phone call? (phone me please!, Please me a phone call for me) | call contact (98%) | ✓ ▶ 1613 — New class... / Split inputs... / Ignore |
| what is the battery status of this device (show my battery status, what's my battery stat) | take a photo (96%) | ✓ ▶ |
| please switch the Bluetooth off (change my Bluetooth setting to off) | modify phone settings | |
| change to airplane mode (switch on airplane mode for me) | modify phone settings (74%) | ✓ ▶ |
| would you kindly open the camera (could you please turn my camera on) | take a photo (67%) | ✓ ▶ |
| can you please give me a call? (please give me a call at 12, I would like you to call me later) | call contact (24%) | ✓ ▶ |

HYBRID APPROACH FOR DEVELOPING, OPTIMIZING, AND EXECUTING CONVERSATIONAL INTERACTION APPLICATIONS

CROSS-REFERENCE TO RELATED APPLICATIONS

This application claims the benefit of, and priority to, U.S. provisional patent application Ser. No. 62/435,700 titled "HYBRID APPROACH FOR DEVELOPING, OPTIMIZING, AND EXECUTING CONVERSATIONAL INTERACTION APPLICATIONS" and filed on Dec. 16, 2016, and is a continuation-in-part of U.S. patent application Ser. No. 14/711,742 titled "NATURAL LANGUAGE DATA ANALYTICS PLATFORM" and filed on May 13, 2015, which is a continuation-in-part of U.S. patent application Ser. No. 13/565,790 titled "SYSTEM AND METHODS FOR DELIVERING ADVANCED NATURAL LANGUAGE INTERACTION APPLICATIONS" and filed on Aug. 2, 2012, now issued as U.S. Pat. No. 8,346,563, on Jan. 1, 2013, and also claims the benefit of, and priority to, U.S. provisional patent application Ser. No. 61/992,728 titled "NATURAL LANGUAGE DATA ANALYTICS PLATFORM" and filed on May 13, 2014, the entire specifications of each of which are incorporated herein by reference in their entirety.

BACKGROUND OF THE INVENTION

Field of the Invention

The disclosure relates to the field of virtual personal assistant software applications, and more particularly to the field of improving conversational interaction between a user and a virtual assistant.

Discussion of the State of the Art

Conversational systems are computational systems that aim to communicate with their human interlocutors in the same way humans communicate among themselves. Systems of this type have been referred to as virtual assistants, intelligent assistants, digital assistants, personal assistants, dialog systems, chatbots, etc., and are built for many different purposes and embodied in many different forms (talking robots, talking wearables, website avatars, mobile apps, messaging apps, smart home devices etc.). However, the core methods underneath needed to achieve conversational interaction and the tasks to solve are the same, independent of the purpose and of the embodiment.

Currently, these systems are still far from achieving a conversational interaction and understanding in the way humans do. One of the main challenges is to interpret the human interlocutor's input correctly, and doing so by taking into account the conversational (dialogue) context as well as the human interlocutor's surrounding, environmental context, since dialogue alone may not convey enough information for a correct interpretation. Human language in conversational interactions tends to rely heavily on contextual information and previous knowledge to avoid redundancy and to make human interactions efficient.

There are, in principle, two different approaches in today's systems when it comes to natural language understanding: rules-based or data-driven methods. Generally, rule-based systems go from pattern-matching to grammatical/syntactic approaches; while data-driven systems may be built by applying statistical approaches, such as various machine learning approaches, as well as, more lately, deep learning. Rule-based systems are designed with hand-crafted rules while data-driven systems are trained from hand-annotated data. Both approaches have pros and cons. Rule-based approaches, if designed well, can achieve quite deep and fine-grained natural language understanding (NLU) with high precision to avoid misunderstandings and be able to interpret quite complex utterances. Data-driven approaches can, if trained on the right type and size of hand-annotated data, achieve a broad and robust behavior able to capture variations of expressions for quite shallow and simple utterances. There is no approach to NLU today that is both deep and broad. The pros and cons are not only technical but also relate to the perception of the system; end-users need to trust the system and feel that it behaves as expected, while developers or owners of the conversational system want to have insight and control over its behavior and the possibility to adjust and quickly fix problems.

What is needed, then, is a combination or hybrid approach that provides the advantages of both rule-based and automated machine learning of conversational applications.

SUMMARY OF THE INVENTION

Accordingly, the inventor has conceived, and reduced to practice, a system and method for a hybrid approach for developing, optimizing, and executing conversational interaction applications.

The invention presented herein relates to a system with an underlying rule-based approach that has overcome many of the problems (see co-owned U.S. Pat. No. 8,346,563, titled "SYSTEM AND METHODS FOR DELIVERING ADVANCED NATURAL LANGUAGE INTERACTION APPLICATIONS"; U.S. Pat. No. 8,892,419, titled "SYSTEM AND METHODS FOR SEMIAUTOMATIC GENERATION AND TUNING OF NATURAL LANGUAGE INTERACTION APPLICATIONS"; and U.S. Pat. No. 8,903,711, titled "SYSTEM AND METHODS FOR SEMI-AUTOMATIC GENERATION AND TUNING OF NATURAL LANGUAGE INTERACTION APPLICATIONS", the entire specifications of each of which are incorporated herein by reference) with rule-based approaches to conversational application development, for example by making it less time-consuming and overwhelming to write rules, allowing for automatic generation and ordering of natural language understanding (NLU) from pre-built building blocks for NLU (so called Language objects) trained on data that capture the wide variation of expressiveness in language as well as allowing for non-experts to re-use these building blocks to more easily build natural language interaction or conversational interaction applications.

The invention presented here discloses a hybrid method to natural language understanding for conversational systems that benefits from the advantages of both rule-based and data-driven approaches while avoiding most of the problems these approaches come with.

The invention strives towards achieving an NLU-based conversational application that may allow for fine-grained precision in interpreting the user inputs, while being robust to errors and variety in order to achieve higher recognition rates and more accurate, precise results. The method proposed may allow conversational applications to go both broader and deeper. This may be achieved by a hybrid approach that combines rule-based and data-driven methods in all stages of a conversational system such as the development phase, the run-time execution (interaction with users) or the optimization phase using collected data from real interactions to improve the system.

The invention provides a means to avoid some of the problems with data-driven approaches such as the need to manually collect, curate and annotate data, as well as non-transparency and lack of control.

The invention presented here describes a system for the development of conversational systems that achieves this by an innovative way of combining rule-based and data-driven methods in a hybrid system. The hybrid methods are applicable to the whole lifecycle of a conversational system and therefore may be used in several stages of the platform, which may include, but is not limited to, a hybrid method to bootstrapping NLU, using data-driven NLU inside NLU rules, combining data-driven and rule-based NLU in runtime conversations, interactive validation in conversations of NLU elements, hybrid method of partitioning collected data, and a hybrid method of optimizing a conversational system.

Given a large number of dialogs and user inputs, systems according to various embodiments of the invention may use a text miner that may automatically group data using unsupervised statistical computing to find linguistic patterns (herein referred to as associations made up of co-occurring concepts), which may be then used to form larger groups of inputs that would express a similar linguistic intention, and may then be handled according to the same "flow" or "flow trigger" to invoke a conversational system. This, in effect, automates the process of tagging large corpora of text-based conversational interactions (for example, the process may start with a large sample of historical chat interactions conducted between humans) with classification data. Manual tagging of corpora is one of the drawbacks of statistical-based NLU systems, since it may be an expensive and slow process. According to the invention, a large corpus of dialog interactions may be automatically tagged and may then be used to train machine learning (ML) NLU models and classifiers.

It may also possible to use an NLU rule language with predefined NLU building blocks to build language rules to quickly annotate and classify the data. A classifier may be based upon several different algorithms and ML pipelines, such as maximum entropy, logistic regression; the specific algorithm chosen is generally based on evaluation, experience and the amount of available data. Classification models may be plugged into the platform (for example, as input processors, global listeners, or as a service may be called upon), and used by a runtime solution, annotating all inputs with recognized classifications (including, of course, "no classification possible" results when the ML-based classifier fails to classify an input). Additionally, multiple classifiers may be used within a single system, either in parallel or in series, to improve results as well as to add annotations to input as it is classified. For example, a second classifier may take previously-classified data and then analyze it to add new metadata, and may be used in further identifying and utilizing the data in future ML-based operations or for use by a user when data is reviewed. Other machine learning models may be used as listeners or to generate triggers in NLI applications as well, according to the invention, such as for example sentiment metric models and named-entity recognition models. Each of these can be used in flows and can automatically annotate dialog inputs, so that the annotations may in turn be used in language rules to guide the NLI application.

In an embodiment of the invention, a developer may build flow triggers with NLU rules that react to the classification annotation. The NLU rule can be further extended using the same rule language with additional contextual information, including fuzzy logic based for example on the confidence of the classification. In this way, one may bootstrap a shallow NLU application and integrate this data-driven NLU inside hand-crafted NLU rules. This may make it possible to combine both approaches to natural language understanding, and therefore may allow the system to interpret inputs both broadly and precisely.

In conversations when the classifier can only make a classification with less than high confidence, one may directly integrate validation of that classification in the dialogue. The validation may take several forms, where clarification and disambiguation flows are the clearer patterns.

Clarification flows may be used to confirm a classification with lower than high confidence. For instance, if user sends an input with lower than high confidence the system may ask the user to confirm the classification. The confirmation is marked in the log data, and may then be queried by a developer for additional confirmation to avoid poisoning the classifier with false data. Once a NLI developer has confirmed the positive confirmation, the classifier is updated with the additional input. Disambiguation flows are extended clarification flows across multiple classifications and may be used when multiple classifications have similar confidence scores.

Using NLI services, such as a machine learning service, for processing logged conversations, it may be possible to find and extract data where users have either had to disambiguate between classifications or confirmed or reject a particular classification assigned automatically using NLU models and rules. These inputs may be presented to a human to confirm or reject, and the decisions by the developer are then integrated in the next training cycle as reinforced training data.

There are currently two big limitations when building machine learning models. The first is access to the necessary amounts of data to build a good performing model. The other limitation is annotating this same data to make it compatible with the machine learning algorithms. The NLU rule language is very suitable for rapidly and precisely specifying NLU rules that can, in conjunction with the interaction engine, be used to process natural language inputs to parse them against the rules. This makes the NLU rule language and interaction engine working together ideal for quickly annotating training data for machine learning systems, as opposed to manually annotating training data. ML models may be then trained from the automatically annotated training data, making it possible to tag up a lot of data quickly and accurately.

One novelty of the invention according to some embodiments, is that instead of required writing of a grammar, the invention makes it possible to generate NLU rules automatically from a few examples and then automatically annotating large amounts of data that matches these rules to use this training data to train ML models. This may result in NLU models that allow for the precision and performance of a rule based approach, but capable of the robustness (higher recall) of a statistical approach.

Another novelty is how these models may be applied in the system of the invention in conjunction with the NLU rules. The ML models may be integrated into the system of the invention as, for example, input processors, global variables, or external services called through an API; and may use input annotations to communicate predictions, and confidence scores from the ML models. The input annotations may then be made available to be used by NLU rules.

This gives the developer a choice in when to use the broader but possibly shallower ML predictions, and when use NLU rules which may be more precise and capable of deeper NLU. It may also allow the developer to make use of contextual restrictions and other constraints to achieve context-aware NLU while depending on the ML predictions. It also lets the NLU rules to be used in conjunction with ML predictions, by using ML predictions from within the NLU rule.

Another method that is part of the hybrid approach to NLU, described herein, is to automatically partition the data that is collected in real interactions with a system built from scratch with the semi-automated rule-based approach (or the combined approach above with classifiers as input processors used in NLU rules). The partitioning may be done by collecting the incoming inputs by the NLU rule they match, and create buckets of positive data that relates to each rule. These buckets of data may then be used at runtime for an alternative approach to NLU when there are no matches with available NLU rules. The input may be evaluated not only against the rules, but also against established buckets of data comprising inputs that have previously been successfully interpreted by the system. This can be done either by applying similarity algorithms (such as cosine, Levenstein, Jaccard, dice, and the like) and fuzzy-logic matching, or the system may train statistical or machine learnt models based on the data buckets and use these models to classify the inputs. When a rule does not match, a developer may check against the rule's relative model to see if the model would classify the user input as belonging to the positive bucket. In this way, we get an alternative broader approach to NLU when the deeper, more precise NLU fails as a back-off method. This broader approach to NLU has the advantage that it may improve and get better over time as more data is collected as the buckets models may be retrained and grow. It is a way of automatically annotating data with NLU rules and train data-driven models from them.

In order to add in control so that the models do not grow in an undesirable direction over time, the hybrid system may allow the developer to review these buckets of data, and decide which inputs are valid for a particular bucket so that discarded inputs would not be taken into account when the model is retrained with the bucket data.

An extension to the idea of positive data buckets would be to also create buckets of negative data that may comprise negative examples provided by the developers, inputs that the developer considers should not have fallen into the positive data bucket, automatically filled with inputs that has fallen into conflicting data buckets, and the like. The developer could then make sure during runtime that each input is evaluated towards both the positive and negative bucket. For instance, an input would only be considered "matching" if the NLU rule is triggered; it is considered similar to the positive bucket examples and not similar to the negative bucket examples; or, if a machine learning approach is used, the ML model classifies it as belonging to the positive bucket and not the negative bucket.

The application of the back-off or "safety net" methods may be implemented in different ways. For example, the bucket approach may be evaluated as a back-off NLU that occurs after a rule has been evaluated and failed; or the NLU rule-based approach could have higher priority, wherein all primary rules may be first evaluated (excluding the safety net, or non-understanding rules), after which the bucket approach to NLU may be evaluated by classifying the inputs by each bucket model according to the order of the associated rules. Another possibility is that all the bucket models are used and the one with highest confidence score is selected.

For a more controlled behavior the hybrid system would allow the developer to decide when and if a NLU rule should be related by a bucket approach or not. This would allow the developer to decide whether to apply a hybrid approach, or stay with a deeper and more precise approach for a specific stage.

For the optimization phase, the hybrid system may apply ML and other data-driven approaches to detect misunderstandings and non-understandings of input in the collected data and propose to the developer how to fine-tune the NLU to cater for it, either by adjusting the NLU rules or by reviewing the NLU buckets.

By going through all non-understandings in the non-understanding bucket and classifying the data with bucket classifiers for NLU (or other similarity algorithms) towards a bucket, inputs that have fallen in the non-understanding bucket may be extracted, and suggestions for where the input should have fallen may be automatically generated and sent to the developer. The developer may then decide whether to adjust NLU rules to account for this, or the developer may simply add the input along with the automated classification to the bucket of positive examples.

As described earlier the developer would be able to go through all buckets of positive inputs to control and verify whether these inputs are correctly interpreted and really belong to the bucket or not. While providing full control, it may be a tedious process to verify every input. The invention would be able to automatically highlight and alert the developer of inputs that have fallen into a specific bucket that has a high certainty of belonging in another bucket. This would be a way to help the developer to find the misunderstandings while maintaining the last decision. In order to achieve this, the system may extract an input from a bucket, retrain that same bucket without that input and then classify the same input with the original bucket as well as with the other NLU buckets of the system that are relevant and conflicting. If another of the conflicting buckets receive a higher score (confidence or similarity score), that input may be highlighted as a possible misunderstanding for the original bucket and marked for adding to the related negative bucket. At the same time, the same input may be recommended as a possible addition to a positive bucket that received the highest score. The platform is also able to make decisions when rules conflict, which may be used to identify what buckets are relevant to each other and resolve possible conflicts.

In one aspect of the invention, a system for hybrid approach to natural language understanding is provided, comprising a machine learning service comprising a memory, a processor, and a plurality of programming instructions stored in the memory thereof and operable on the processor thereof, wherein the programmable instructions, when operating on the processor, cause the processor to create a new natural language understanding model based at least in part by a plurality of user-provided examples, and provide a natural language understanding model dataset comprising at least the new natural language understanding model to other components of the system; an integrated development environment comprising a memory, a processor, and a plurality of programming instructions stored in the memory thereof and operable on the processor thereof, wherein the programmable instructions, when operating on the processor, cause the processor to: retrieve the natural language understanding model dataset from the machine learning service, and publish a runtime solution by combining at least a natural language understanding rule and a natural language understanding model dataset; and an interaction engine comprising a memory, a processor, and a plurality of programming instructions stored in the memory thereof and operable on the processor thereof, wherein the programmable instructions, when operating on the processor, cause the processor to: retrieve the runtime solution from the integrated development environment, receive a natural language input from an external interface, process the natural language input by at least annotating and classifying the input, generate a log dataset based at least on how the runtime solution and processed input interprets the natural language input, and store the natural language input and log dataset to a log storage; wherein, the machine learning service may automatically request the log dataset from the log storage to retrain and improve the natural language understanding model dataset.

In another embodiment of the invention, data from the log storage is continuously used by the machine learning service to retrain available models as more interaction data is received. In another embodiment of the invention, the retrained models are used to create an updated runtime solution.

In another embodiment of the invention, a new natural language model is automatically created using data from the log storage for processing an unfamiliar natural language input based at least on structure of the runtime solution and a plurality of example inputs. In another embodiment of the invention, data from the log storage is processed by the machine learning service to determine data usable for optimizing available natural language rules, and sent to the integrated development environment to optimize available rules. In another embodiment of the invention, data from the log storage is processed by the machine learning service determine data that requires manual labeling, and sent to the integrated development environment for manual labeling. In another embodiment of the invention, data from the log storage is processed by the machine learning service determine data that is usable for a self-learning process, and use the data to automatically retrain available natural language understanding models. In another embodiment of the invention, a text miner comprising a memory, a processor, and a plurality of programming instructions stored in the memory thereof and operable on the processor thereof, wherein the programmable instructions, when operating on the processor, cause the processor to: receive historic natural language data from a plurality of sources, process the natural language data by at least classifying the annotating the natural language data, and provide the processed language to other components of the system to use in retraining natural language understanding models. In another embodiment of the invention, a plurality of positive data is fed to the system to improve available machine learning models.

In another aspect of the invention, a method for hybrid approach to natural language understanding is provided, comprising the steps of: (a) creating a new natural language understanding model based at least in part by a plurality of user-provided examples using a machine learning service; (b) providing a natural language understanding model dataset comprising at least the new natural language understanding model to other components of the system using the machine learning service; (c) retrieving the natural language understanding model dataset from the machine learning service using an integrated development environment; (d) publishing a runtime solution by combining at least a natural language understanding rule and a natural language understanding model dataset using an integrated development environment; (e) retrieving the runtime solution from the integrated development environment using an interaction engine; (f) receiving a natural language input from an external interface using the interaction engine; (g) processing the natural language input by at least annotating and classifying the input using the interaction engine; (h) generating a log dataset based at least on how the runtime solution and processed input interprets the natural language input using the interaction engine; (i) storing the natural language input, and log dataset to a log storage using the interaction engine; (j) requesting the log dataset from the log storage using the machine learning service; and (k) retraining and improving the natural language understanding model dataset using the machine learning service.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 13 is a diagram illustrating an exemplary interface displaying a number of natural language resources used by the hybrid system in various embodiments of the invention.

FIG. 14 is a diagram illustrating groups of NLU resources based on associations identified by a text miner from the data sample in FIG. 13.

FIGS. 16A to 16C are diagrams illustrating a classification workbench interface within an NLI application development environment as used in various embodiments of the invention.

DETAILED DESCRIPTION

Figure 1:
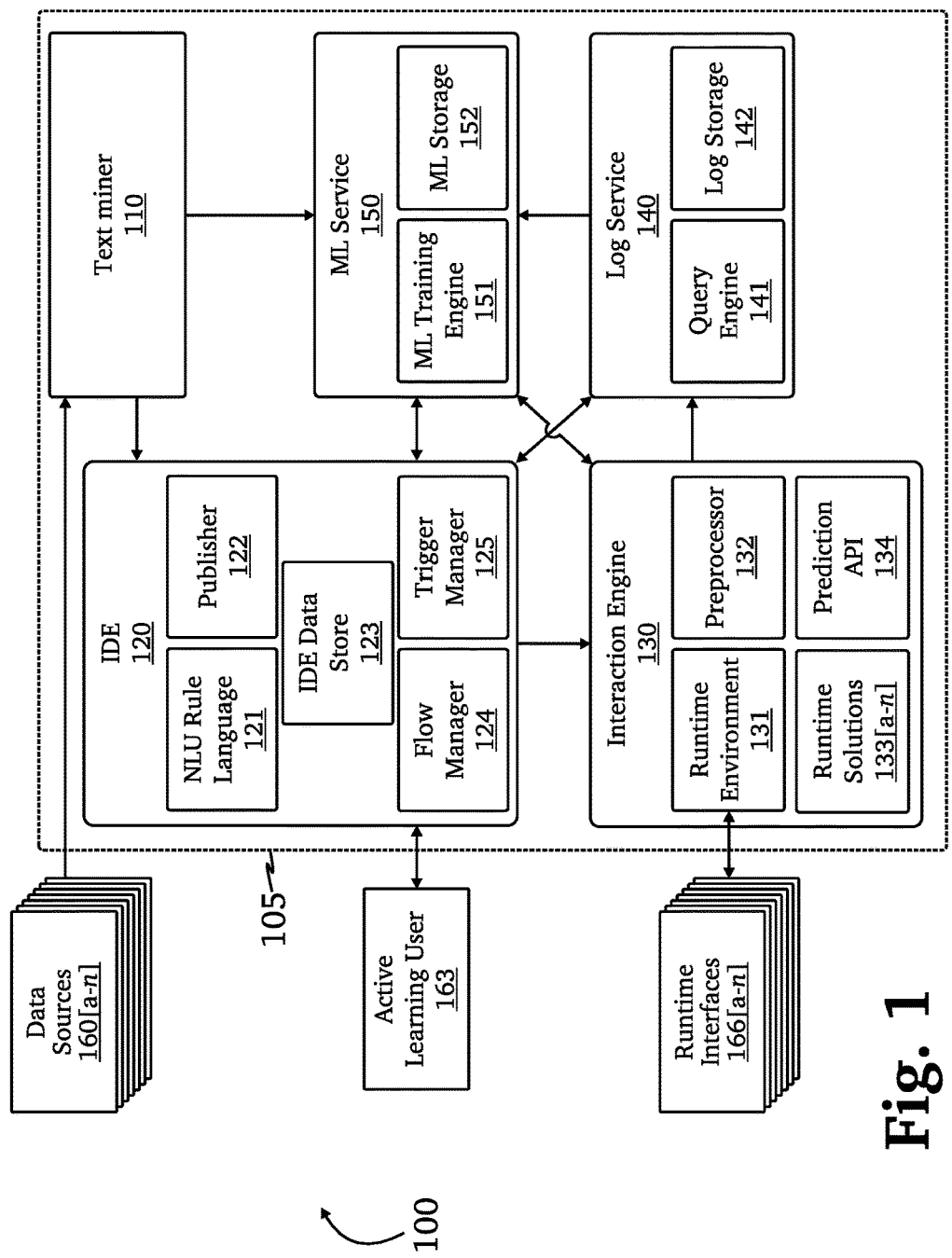
FIG. 1 is a block diagram illustrating an exemplary system architecture for a hybrid system 105 for a hybrid conversation analytics environment, according to a preferred embodiment of the invention.

The inventor has conceived, and reduced to practice, in a preferred embodiment of the invention, a system and method for a hybrid approach for developing, optimizing, and executing conversational interaction applications.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"NLU" refers to natural language understanding, referring to the conversational approach utilized by the embodiments of the invention to receive and handle natural language within a hybrid system.

"NLI" refers to natural language interaction, and refers to an overall interaction experience wherein a user may use natural language to interact with a system. According to the various embodiments herein, an NLI application such as a virtual personal assistant may utilize NLU functionality, and it should be appreciated that NLU is used to refer to an internal function and NLI is used herein to refer to an overall arrangement or experience.

A "language recognition rule" or "NLU rule" is a specific type of condition built up from language objects and used for capturing natural language expressions. For example, a language recognition rule can be used to interpret or capture the intention of a user request.

As used herein, a "language object" means an abstract representation of a logical unit of human linguistic expression that has meaning and is suitable for processing by automated systems such as virtual assistants. Language objects, in their simplest form, are represented as single words that represent a plurality of variants of a single common meaning, including inflectional variants and variants connected by synonymy. That is, generally a language object represents all variants and synonyms of the core word that represents it, and language objects may contain grammatical variants of words as well (such as verb tenses, contractions, and so forth).

As used herein, "safety net" means a special flow type which is invoked when a user request fails to satisfy any condition (i.e., no matches were found); it is used to ensure that some form of response is made, after which generally the last active flow is resumed where it left off.

As used herein, a "flow" is a logical task unit comprising a set of related interaction steps required (and preconfigured) in order to perform a task. Typically, a flow may comprise one or more transition conditions and operative nodes. A flow is typically defined in a natural language system as a series of predefined steps to perform when some triggering condition is satisfied.

As used herein, a "trigger" is a flow activator that, when fulfilled or satisfied, will activate a flow associated to the trigger. A trigger may comprise a NLU rules, annotations, how a received input was classified, or other conditionals. An NLI runtime solution may have a trigger base, wherein the triggers that may invoke flows.

Conceptual Architecture

FIG. 1 is a block diagram illustrating an exemplary system architecture 100 for a hybrid system 105 for a hybrid conversation analytics environment, according to a preferred embodiment of the invention. System 105 comprises a text miner 110, an integrated development environment (IDE) 120, an interaction engine 130, a log service 140, and a machine learning (ML) service 150. System 105 utilizes a dynamic annotation layer to annotate natural language data whose process may be dynamically tuned using input processors, solution scripting, and the like. Annotations may be generated based on based on NLU context, sentence structure, user specific configurations, more complex machine learned models, and the like. Annotations may be used inside triggers, and in creating conditions that more precisely identify sentence elements that are necessary for interpreting the input correctly.

The functions of system 105 may be governed with user-created and user-manageable triggers and process flows, created and managed using a flow manager 124 and a trigger manager 125, respectively, and may be found inside IDE 120. Triggers may be based on, for example, category of a particular input, conversational context gleaned from real-time inputs of an interaction session, and the like. As mentioned above, a runtime solution may comprise a trigger base (which may contain NLU rules, ML triggers, hybrid triggers, annotations, and the like) that may invoke flows. Flows may be a pre-set sequence of commands that may include, but is not limited to, annotating an input, querying an external data source, creating or retraining NLU models, initiating data selection for self-learning and active-learning, and the like.

The trigger base may have a preferred order of execution that may be automatically adjusted over time by system 105 to be more efficient in NLU as, for example, more natural language data is processed, when new models are created or existing ones improved upon, for a certain set of annotations to be used most efficiently, flows and triggers are adjusted, and the like. Additionally, adjustments made to flows, for example, when adding a new flow or deleting existing flows, may initiate a retraining process for affected NLU models, which may automatically improve the NLU capabilities of the system without requiring input or explicit instruction from a developer.

IDE 120 comprises NLU rules language 121, which may be used to quickly and precisely create NLU rules to process, annotate, and classify unstructured language objects rule language; a publisher 122, which may be configured to combine NLU rules and ML models, and published into a runtime solution used by interaction engine 130; and IDE data store 123 that may be used to store NLU rules created using rules language 121, ML rules, hybrid rules, flows, triggers, and the like. IDE 120 may be used to provide a development environment where a user may modify or interact with NLU resources and flows, as shown below (referring to FIG. 13 and FIG. 14). IDE 120 may include a conversational analytics environment that enables a user to analyze and review interactions as they occur naturally during general interaction and during development; for example, to identify real-time natural language input that may not inappropriately handled by the system (for example, if the input was misinterpreted or misunderstood), to adjust and optimize application interaction flows, or as an endpoint for when active learning involving manual labeling by an active learning user 163 is required. Adjustments, such as changing the classification of an input, may take effect in real-time without the need for a developer to redeploy or republish. An example of an active-learning interface is provided below in FIGS. 16A to 16C.

Interaction 130 engine may be configured to provide natural language solutions for customers via a wide variety of interaction applications or interfaces 166[a-n], to enable user interaction via natural language in a manner that is fluid and native for the user. Interfaces may include, but is not limited to, world wide web, mobile, messaging, connected homes, connected cars, internet of things (IoT), social media, and wearable electronics. Interaction engine 130 may comprise a runtime environment 131, a preprocessor 132, a plurality of runtime solutions 133 created by publisher 122, which may be used to process user inputs; and a prediction API 134, which may be configured to predict confidence ratings, annotations, classifications, and the like for user input. Runtime environment 131 may be a user-facing natural language application hosted on interfaces 166[a-n], which may be used to receive and collecting interaction inputs. Preprocessor 132 may be used to preprocess inputs by, for example, normalizing, performing spelling correction, tokenization, sentence splitting, morphological annotation, name entity detection, sentiment analysis, and the like. This may allow users some freedom in how an input is worded and phrased to make it natural to that particularly user with minimal adverse effects on response accuracy. Solutions 133[a-n] are created by combining NLU rules and ML models into a runtime format via publisher 122. Solutions 133[a-n] may be used by the interaction engine to create reactionary responses to user inputs, which may be, for instance, an answer to a query or to perform a certain function requested by the user; and may also contain prediction models used by the prediction API. Prediction API 134 may configured to produce predictions using predictions models in runtime solutions 133[a-n] on how to process and annotate user inputs received by runtime environment 131.

Log service 140 may comprises a query engine 141 and a log storage 142; and may be used to store and query interaction data and metadata collected during runtime. Metadata may include triggers activated, flows activated, classifications, prediction results, variables set, external data collected, and the like which may be used in improving NL models and classifiers.

ML service 150 may comprise a ML training engine 151 and a ML storage 152. ML training engine 151 may be configured to automatically create new NLU models or improve existing ML models through self-training based on, for example, the structure of a runtime solution, user-provided example inputs, new interaction data, classified and annotated historical natural language data, and the like. ML storage 152 may store ML models and model-related information, such as parameters and hyper-parameters, and allow for retrieval by other components of system 105. ML service 150 may be configured to extract data from log service 140, and automatically partition the data with labels using the logged metadata, such as flow trigger, trigger info as labels, or to identify data that was not understood by the system. For example, once extracted, the data may be used in a hybrid self-learning process (discussed in FIG. 6), a hybrid active-learning process (discussed in FIG. 7), automated NLU rules optimization, adding to positive or negative buckets of data, and the like.

Text miner 110 may be used to quickly and automatically analyze, organize, and annotate unstructured language objects gathered from a plurality of data sources 160[a-n], which may include stored historical interactions, synthetically generated data, publicly available transcribed data, and the like, enabling their use in analysis and construction of NLI application flows, resources, and training machine learning models. Text miner 110 may also be configured to allow easy importing and exporting of large amounts processed data, which may be useful, for example, for developing multiple applications or deploying to multiple locations without needing to start building the natural language models from scratch, and may also enable easy sharing of processed data.

Besides active-learning and self-learning, system 105 may be configured to present users with clarification responses as an attempt to self-learn from data that may otherwise be deferred to an active-learning process. Example methods for clarification may be found below in FIGS. 11 and 12.

Another way the ML models may be trained is by feeding system 105 examples of "positive" data, such as using a known quantity of questions regarding the weather to train it how to recognize "weather" as a topic of conversation. This may trigger a retraining process for existing models, and may also trigger automatic creation of a new NLU model. This may allow the analysis of a large number of input sets on a wide variety of topics to enhance recognition by building patterns from the data and using those patterns to classify new or unknown requests. Examples of unstructured data and categorized data may be found below in FIGS. 13 and 14, respectively.

Detailed Description of Exemplary Aspects

Figure 2:
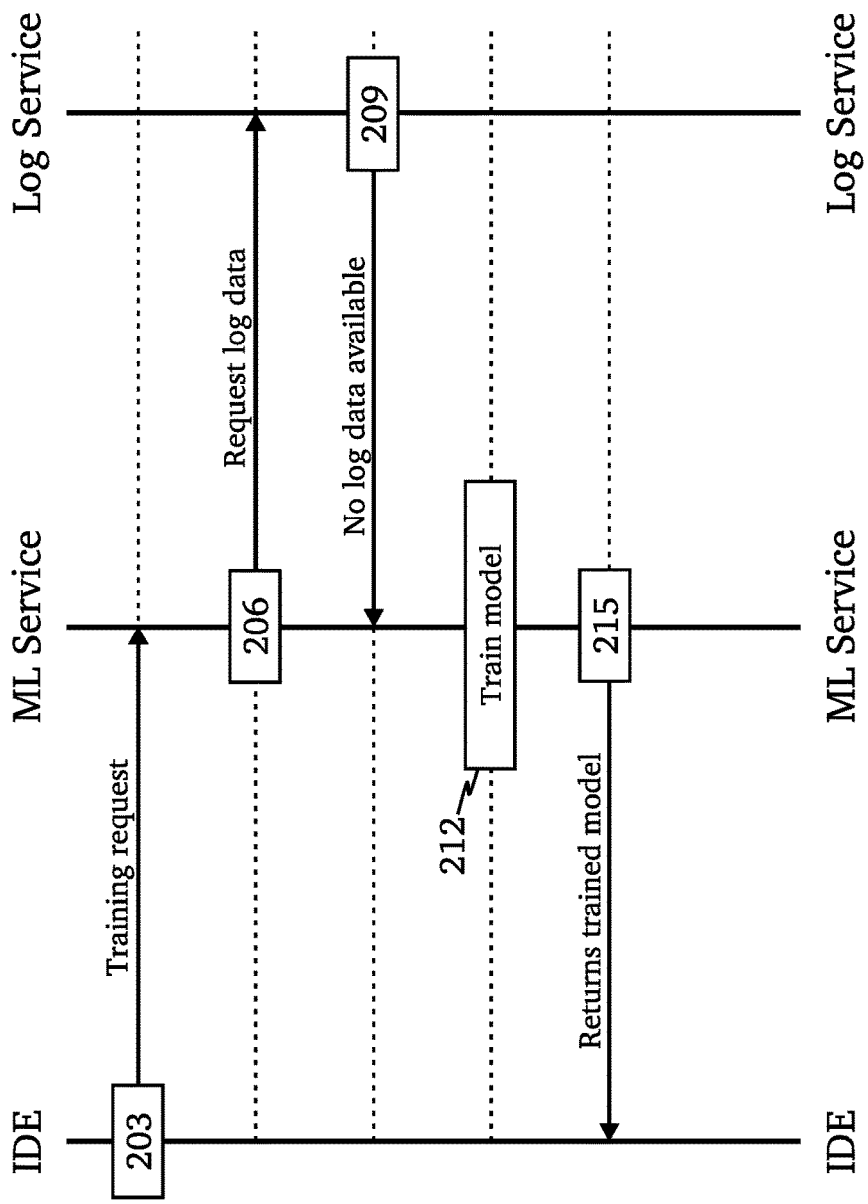
FIG. 2 is a sequence flow diagram illustrating a sequence for creating a new NLU model as used in various embodiments of the invention.

FIG. 2 is a sequence flow diagram illustrating a sequence 200 for creating a new NLU model as used in various embodiments of the invention. At an initial step 203, an initial training request is sent using an IDE to a ML service. At step 206, the ML service requests and retrieves log data from a log service. At step 209, the log service responds that no log data is available relating to the request submitted from the IDE. At step 212, the ML service trains a new model using a hyper-parameter set. At step 215, the ML service returns the trained model to the IDE.

Figure 3:
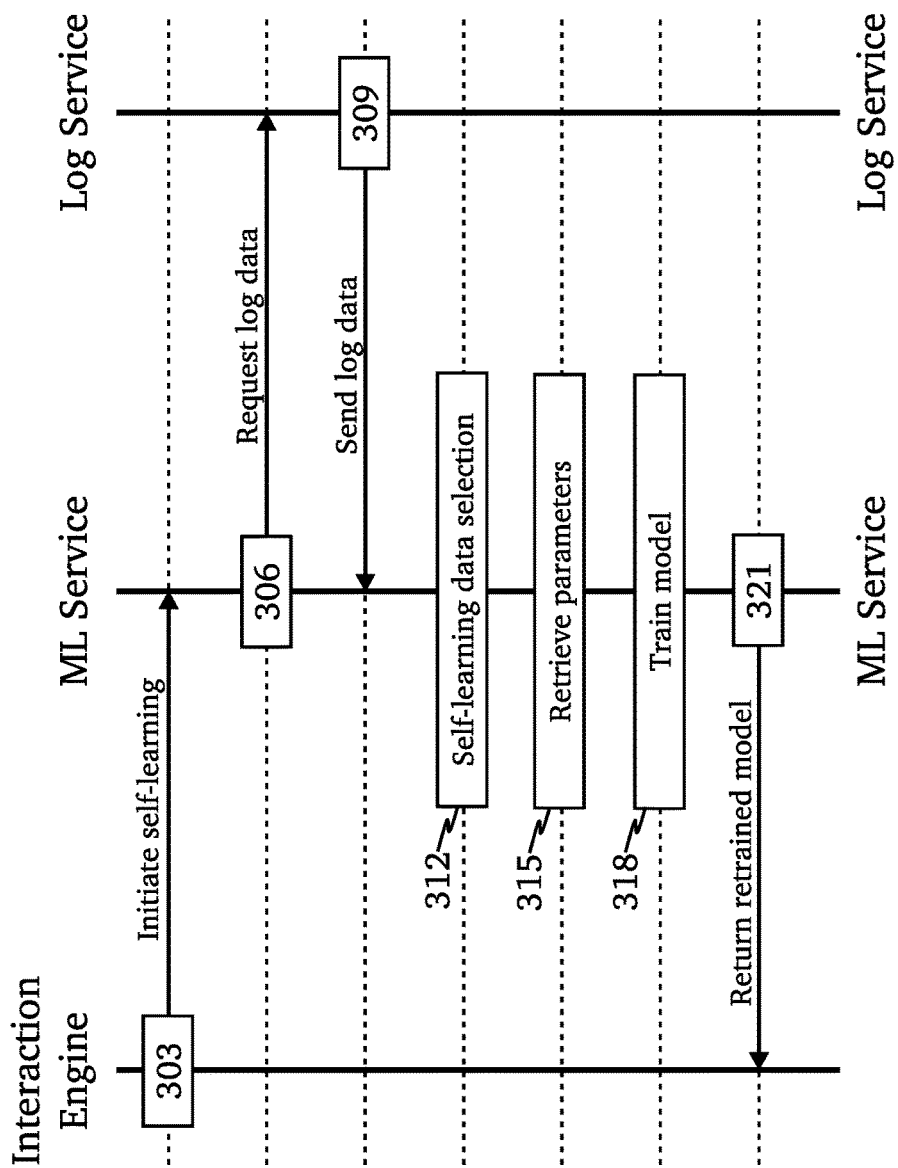
FIG. 3 is a sequence flow diagram illustrating a sequence for a self-learning process as used in various embodiments of the invention.

FIG. 3 is a sequence flow diagram illustrating a sequence 300 for a self-learning process as used in various embodiments of the invention. At an initial step 303, a model retraining request is requested by an interaction engine to a ML service. This may occur when, for instance, new data has been input that warrants an update to existing models. At step 306, the ML service requests log data relating to the model from a log server. At step 309, the log server sends the requested log data to the ML service. At step 312, the ML service processes the log data and extracts log data which is suitable for self-learning is located. A method for self-learning is discussed in further detail in FIG. 6. At step 315, the ML service retrieves parameters, which may be default parameters or optimized hyper-parameters, for model retraining. At step 318, the ML service retrains the model. At step 321, the retrained model is returned to the IDE.

Figure 4:
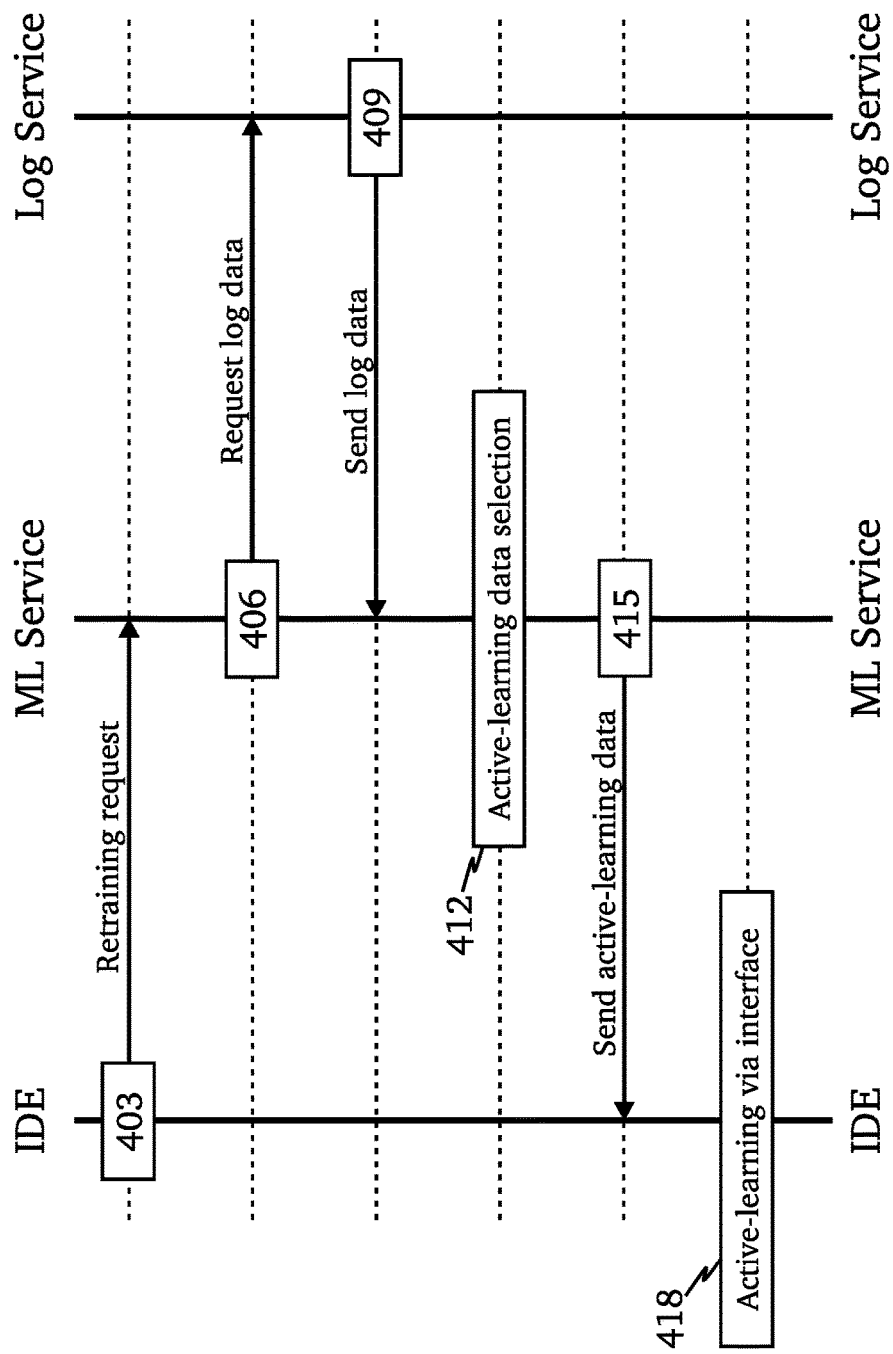
FIG. 4 is a sequence flow diagram illustrating a sequence for an active-learning process as used in various embodiments of the invention.

FIG. 4 is a sequence flow diagram illustrating a sequence 400 for an active-learning process as used in various embodiments of the invention. At an initial step 403, a developer initiates an active-learning process from an IDE. This may be, for example, triggered by a request to access an active-learning interface (an example is described below in FIGS. 16A to 16C). At step 406, the ML service requests log data relating to the model from a log server. At step 409, the log server sends the requested log data to the ML service. At step 412, the ML service processes the log data and locates any data that may require manual processing through active-learning. A method for active-learning is discussed in FIG. 7. At step 415, the selected data is sent to the IDE, and presented to the developer in the active-learning interface. At step 418, the developer may make adjustments to natural language interactions that the system could not handle with existing NLU models and rules.

Figure 5:
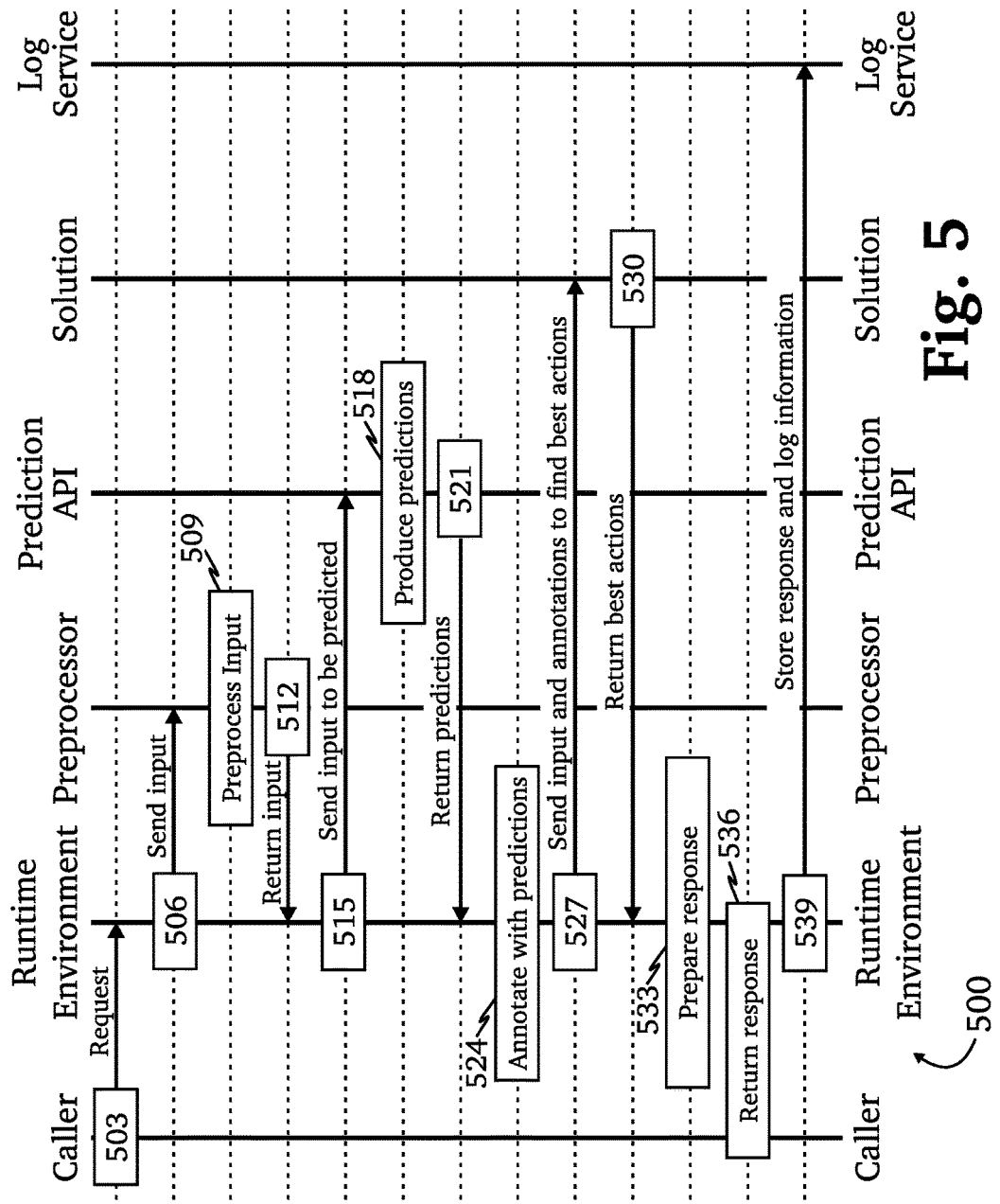
FIG. 5 is a sequence flow diagram illustrating a sequence for processing a runtime environment request as used in various embodiments of the invention.

FIG. 5 is a sequence flow diagram illustrating a sequence 500 for processing a runtime environment request as used in various embodiments of the invention. At an initial step 503, a caller sends a request to a runtime environment. This may include input from the caller, as well any necessary parameters associated with the input. At step 506, the runtime environment sends the input to a preprocessor. At step 509, the preprocessor preprocesses the input, which may include tokenization, spelling corrections, and the like. At step 512, the processed input is returned to the runtime environment. At step 515, the runtime service sends the preprocessed input to a prediction API. At step 518, the prediction API produces predictions using prediction models, which are in a runtime format. At step 521, the prediction API returns a prediction representation back to the runtime environment. At step 524, the runtime service annotates the input with the prediction data produced during step 518. This may include a most relevant prediction, a plurality of top-ranking relevant predictions, probability scores, fuzzy-logic representations of the input, and the like. At step 527, the runtime service uses the input and annotations to find a best course of action from the available trigger base and associated flows. At step 530, the best matching actions are sent to the runtime environment. At step 533, the runtime environment prepares a response or responsive actions based on the best matching actions. At step 536, the runtime environment responds to the caller's initial input. At step 539, the runtime service sends the response, with detailed log information, to a log service for storage, and possible use in improving models.

Figure 6:
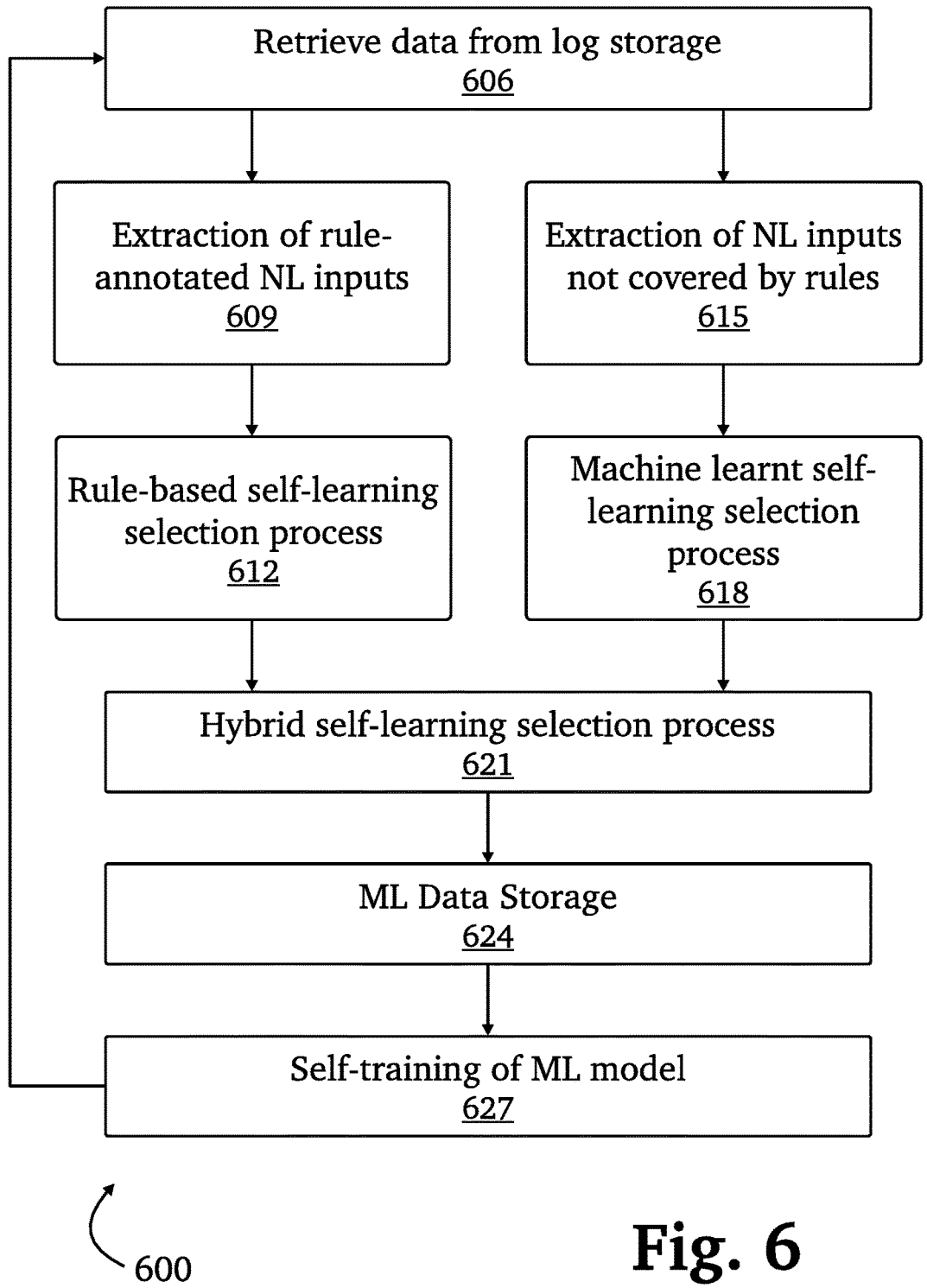
FIG. 6 is a flow chart illustrating a method for hybrid self-learning as used in various embodiments of the invention.

FIG. 6 is a flow chart illustrating a method 600 for hybrid self-learning as used in various embodiments of the invention. Method 600 may be automatically initiated by, for example, changing flows, adding new input examples, new data received by a text miner, new interaction data, and the like. At an initial step 606, natural language data is retrieved from a log storage and queued to a ML service for processing. At step 609, the data that is processable by available NLU rules are extracted, and used to start rule-based self-learning at step 612. On the other side at step 615, which may be occurring simultaneously with steps 609 and 612, data that is not covered by available NLU rules is extracted, and machine learnt self-learning is started at step 618. Once the data has undergone either rule-based or machine learnt self-learning, a hybrid self-learning selection process occurs at step 621. At step 624, the data produced from the selection process is stored in a ML data storage. At step 627, the data is used to improve available machine learning models. It will be appreciated by one skilled in that art that the process may be a continuous loop. As the process runs over time, the natural language models may self-improve as more data is gathered and processed.

Figure 7:
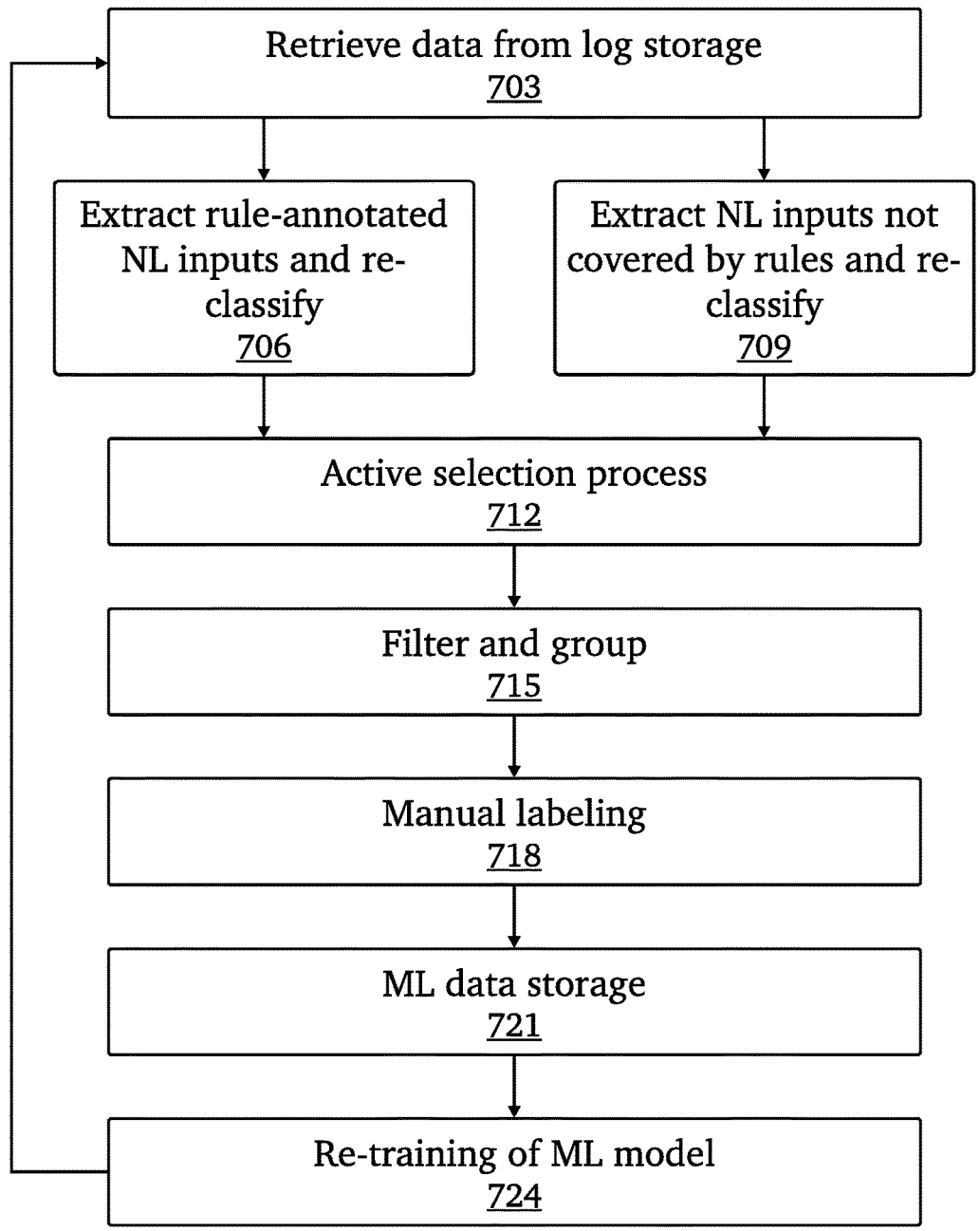
FIG. 7 is a flow chart illustrating a method for hybrid active learning as used in various embodiments of the invention.

FIG. 7 is a flow chart illustrating a method 700 for hybrid active learning as used in various embodiments of the invention. As discussed above, method 700 may be initiated by preset triggers, for example when a developer accesses an active-learning interface. At an initial step 703, natural language data is retrieved from a log storage and queued to a ML service for processing. At step 706, rule-annotated NL inputs are extracted and reclassified using available ML models. At step 709, which may be occurring simultaneously to step 706, NL inputs not covered by available NLU rules are extracted and re-classified using available models. At step 712, an active selection process is started to find data that has been determined to require manual labeling. This may be based on, for example, certainty-based methods, committee-based methods, explicit or implicit conversational behavior of the user (confirmations or explicit rejections), and the like. At step 715, the data is filtered and grouped to remove unneeded data which may include profanities, nonsensical inputs, and the like. At step 718, the data may be sent to an IDE to be manually labeled using, for example, an active-learning interface as shown in FIGS. 16A to 16C. At step 721, information regarding how the unfamiliar data was labeled and classified by the user is sent to a ML data storage. At step 724, the information is used to improve machine learning models so that the models may be used to process future interactions, and, therefore, may now be capable of self-learning from similar inputs. Similar to the method in FIG. 6, method 700 may also be a continuous loop.

Figure 8:
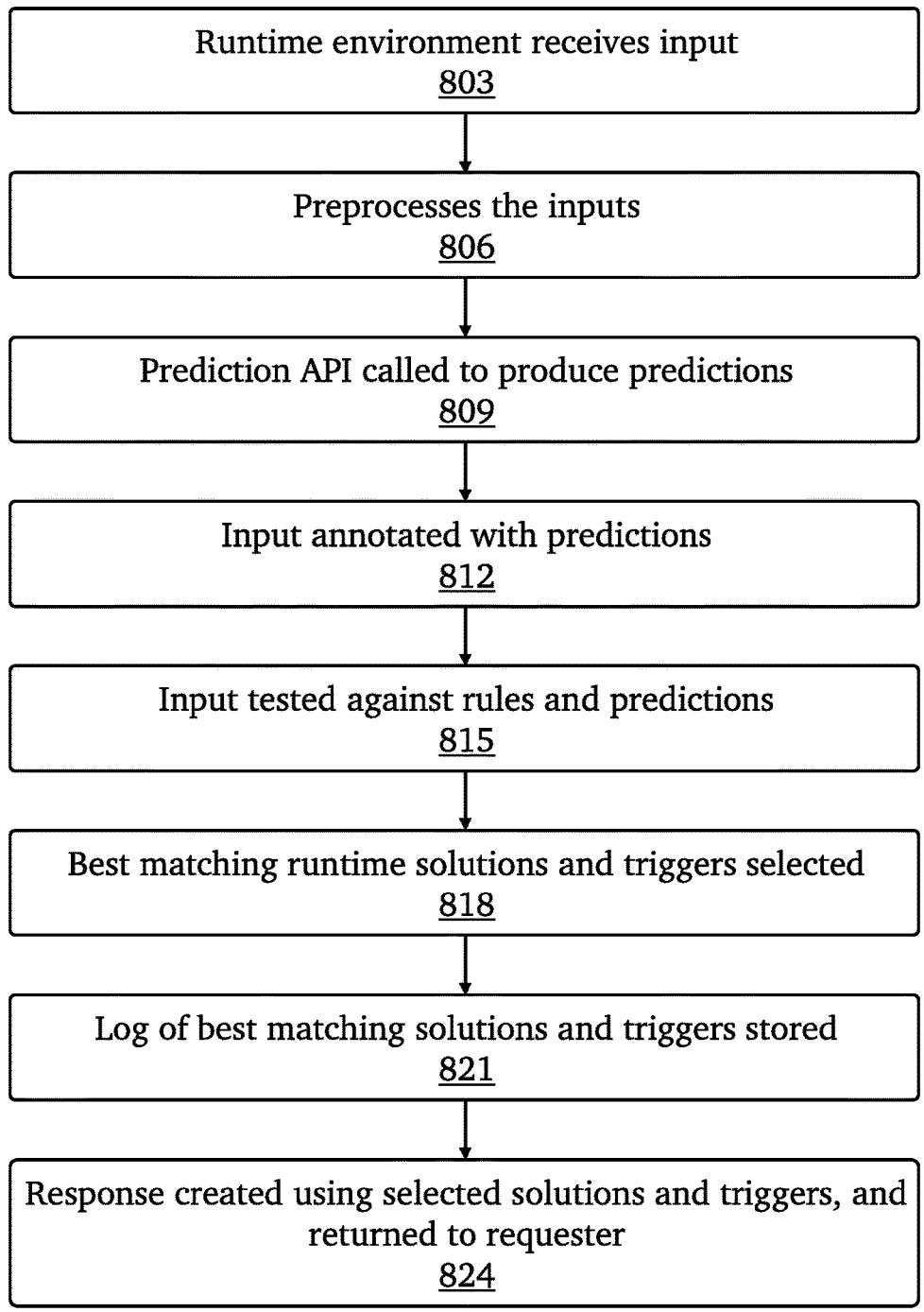
FIG. 8 is a flow chart illustrating a method for processing an input received by a runtime environment as used in various embodiments of the invention.

FIG. 8 is a flow chart illustrating a method 800 for processing an input received by a runtime environment as used in various embodiments of the invention. At an initial step 803, a runtime environment receives input in the form of a request from a runtime interface, some of which are mentioned above in FIG. 1. At step 806, a preprocessor processes and annotes the natural language input, for example, to perform spell checking, normalizing, performing spelling correction, tokenization, sentence splitting, morphological annotation, name entity detection, sentiment analysis, and the like. At step 809, a prediction API may be called to produce predictions regarding processing steps for the input. At step 812, the input is annotated using the predictions produced during step 809. At step 815, the input is evaluated against an ordered NLU trigger base made up of NLU rules, ML triggers (for example, fulfilling predictions), or hybrid triggers (for example, predictions and rules). At step 818, one or more best matching triggers and flows are selected. This may be based on, for example, a confidence score calculated by comparing to rules and predictions during step 815. At step 821, the metadata for best flows and triggers are stored into log storage. This data may be used to further train ML models to improve NLU for subsequent interactions. At step 824, a response is created based the selected solutions and triggers, and returned to the requester via the runtime environment.

Figure 9:
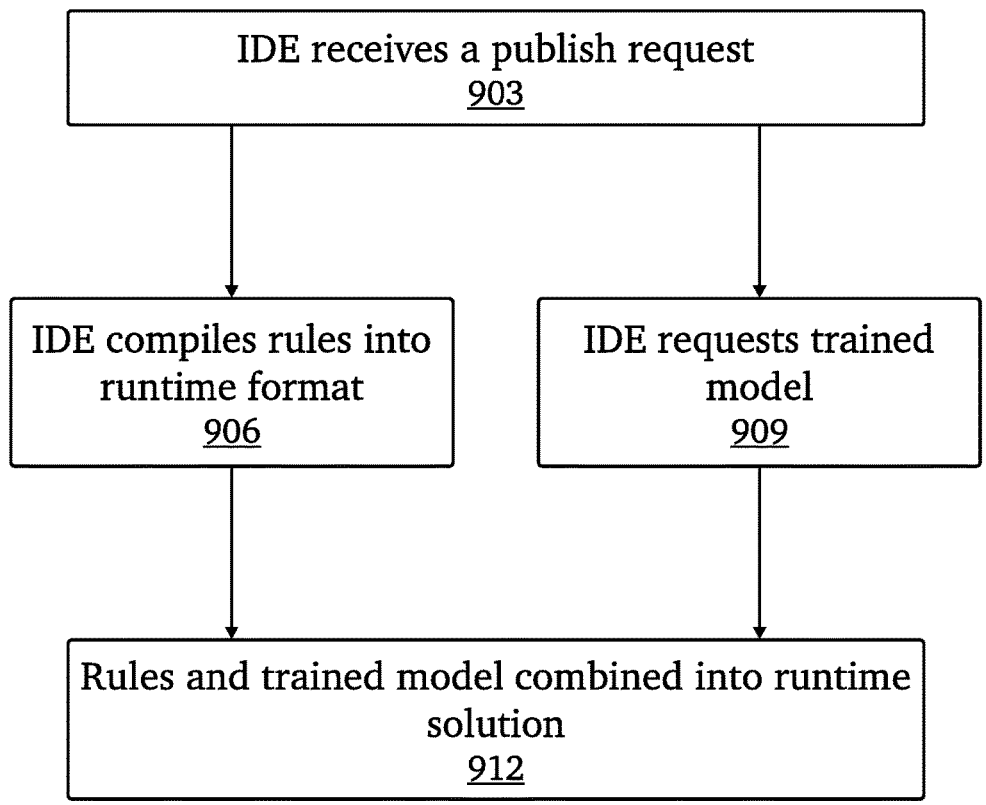
FIG. 9 is a flow chart illustrating a method for processing a publish request for creating a runtime solution as used in various embodiments of the invention.

FIG. 9 is a flow chart illustrating a method 900 for processing a publish request for creating a runtime solution as used in various embodiments of the invention. At an initial step 903, a publishing request is sent to an IDE. At step 906, the IDE compiles NLU rules, dialog flows, integrations, scripts, and the like into a runtime format. At step 909, which may be occurring simultaneously with step 906, the editor requests and retrieves a trained model from an ML data store. A method for requesting a trained model is discussed in FIG. 10. At step 912, the rules and train model are published into a runtime solution by a publisher in the IDE.

Figure 10:
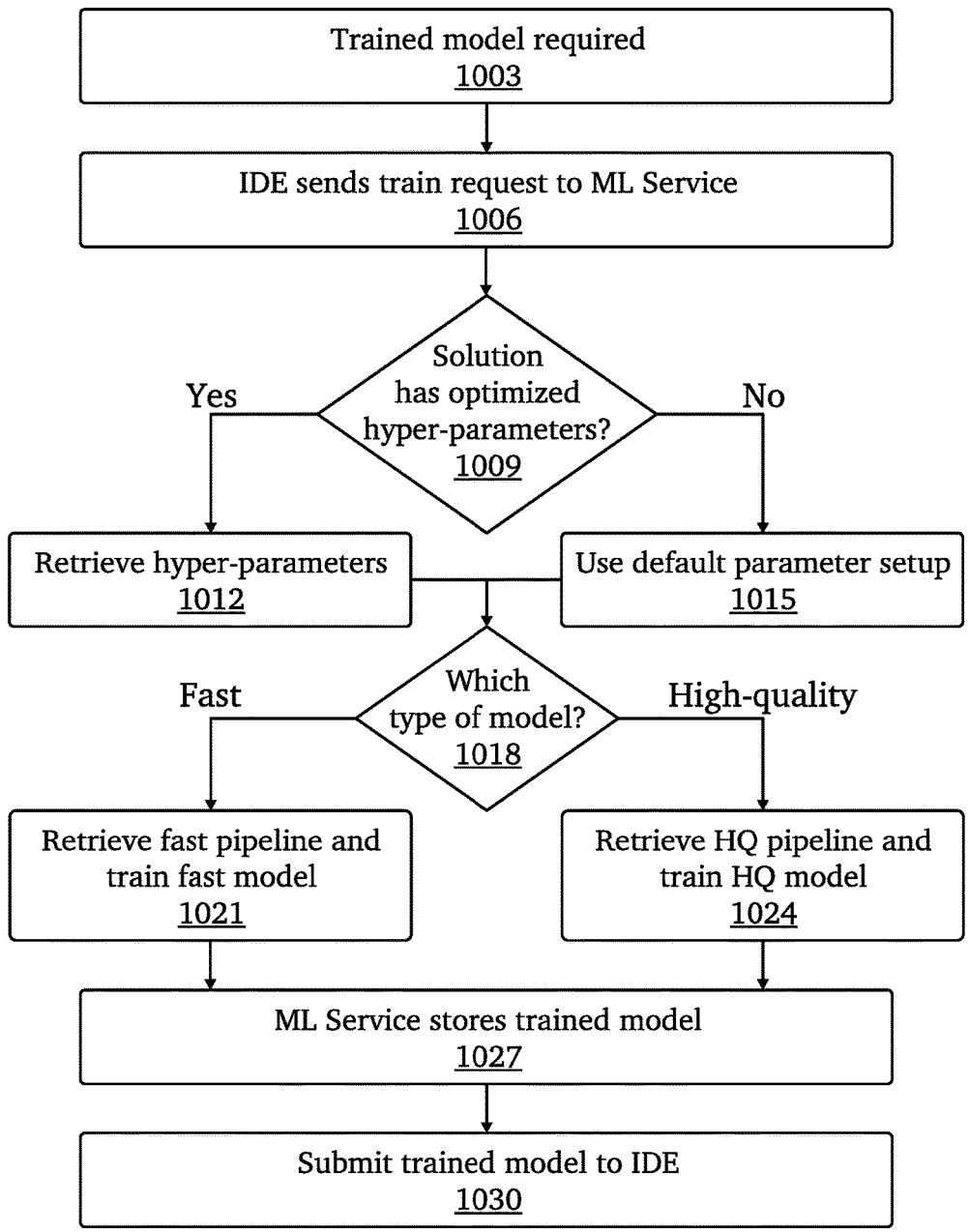
FIG. 10 is a flow chart illustrating a method for processing a request for a trained model from an IDE as used in various embodiments of the invention.

FIG. 10 is a flow chart illustrating a method 1000 for processing a request for a trained model from an IDE as used in various embodiments of the invention. At an initial step 1003, a trained model is required, for example, for publishing a runtime solution as discussed in FIG. 9. At step 1006, a request for a trained model is sent from an IDE to a ML service. At step 1009, a check for whether the solution has pre-existing optimized hyper-parameters available. If hyper-parameters are available, the hyper-parameters are retrieved at step 1012. If not, default parameters are retrieved at step 1015. At step 1018, a check is conducted for which type of model is required: a fast model, or a high-quality model. If a fast model is required (for quickly adding and adjusting data, and quickly retraining a model), a fast pipeline is used, and a fast model is trained at step 1021. On the other hand, if a high-quality is required (when speed isn't necessary, and therefore a more thorough approach), a high-quality pipeline is used, and a high-quality model is trained at step 1024. At step 1027, the resulting trained model from either step 1021 or 1024, is stored using a ML service. At step 1030, the trained model is submitted to the IDE.

Figure 11:
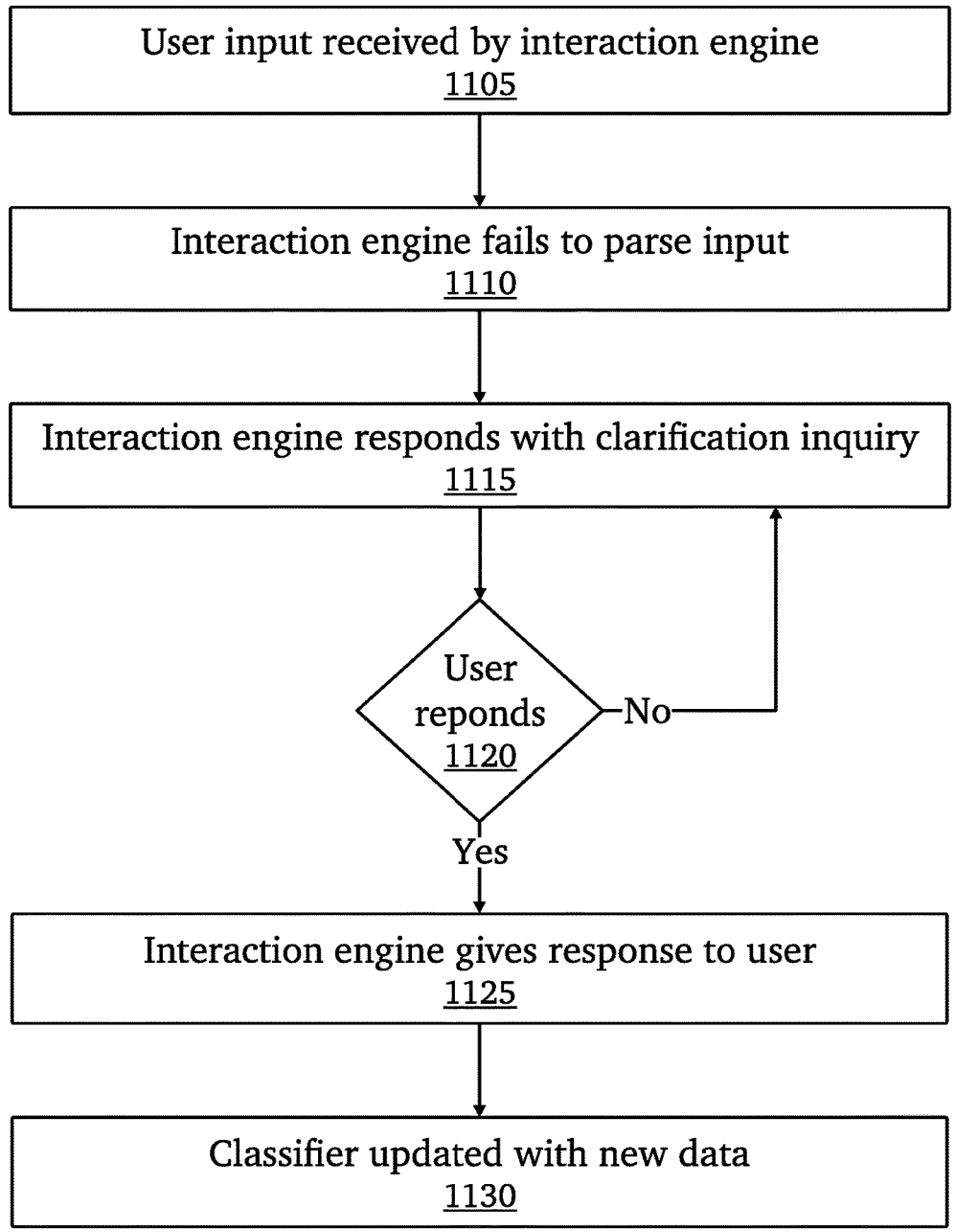
FIG. 11 is a flowchart illustrating a method for clarifying an interaction input as used in various embodiments of the invention.

FIG. 11 is a flowchart illustrating a method 1100 for clarifying an interaction input as used in various embodiments of the invention. At an initial step 1105, input from a user is received by an interaction engine. At step 1110, the interaction engine fails to process the input. This may be a result of unclear language usage, an unusually structured sentence, or the like. At step 1115, the interaction engine responds with a clarification inquiry. At step 1120, if the user gives a negative response to the inquiry, the interaction may return to step 1115, and try the next likely class or topic that the initial input may be associated with. Otherwise, if the user gives a positive response to the inquiry, the interaction engine gives a response to the user at step 1125. At step 1130, the clarifying data from the interaction may be used to improve machine learning models for future interactions.

For example, the user may ask an airline chatbot "Can my uncle and I sit together". The interaction engine may not have encountered the requisite data to parse the meaning of the sentence, but some words with known associations such as "sit" may have been noted by machine learning models.

The interaction engine may respond with "I don't really know what this input is about. Is it perhaps about seats?". The user may then respond with a "yes", and the interaction provides the user with an answer relevant to the initial question.

Figure 12:
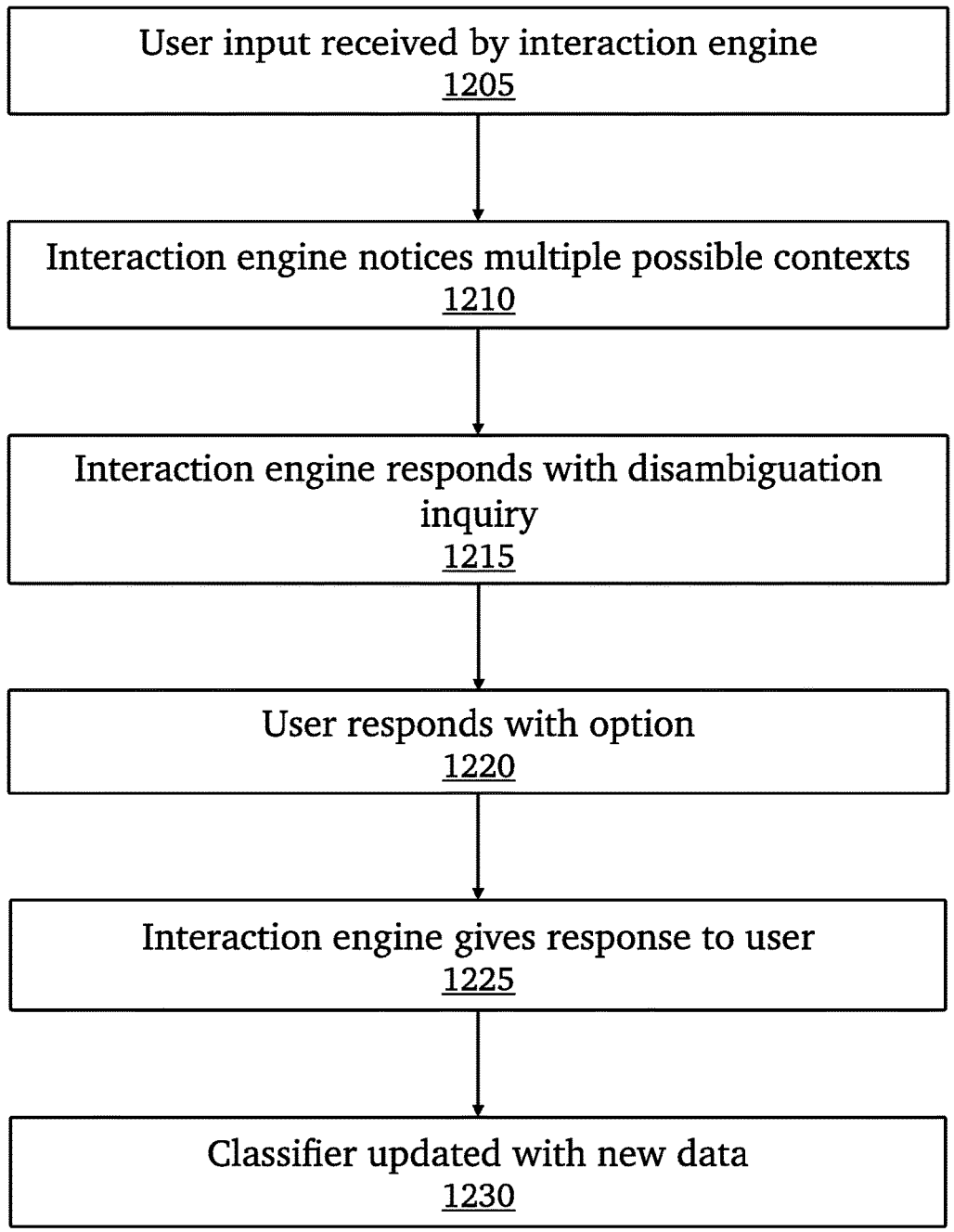
FIG. 12 is a flowchart illustrating a method for processing an ambiguous interaction as used in various embodiments of the invention.

FIG. 12 is a flowchart illustrating a method 1200 for processing an ambiguous interaction as used in various embodiments of the invention. At an initial step 1205, input from a user is received by an interaction engine. At step 1210, the interaction engine processes the input and notices that there are multiple possible contexts. At step 1215, the interaction engine responds with a disambiguation inquiry, asking the user to clarify which context is the intended context. For simplicity, it is assumed that the interaction engine provides the intended context amongst the available options, but it should be understood that there may be instances in which the interaction does not provide the correct context. At step 1220, the user responds with one of the options. At step 1225, the interaction engine gives a response to the user based on the provided context. At step 1230, the data from the interaction may be used to improve machine learning models for future interactions.

To provide an example, a user asks an airline chatbot "how do I select what kind of bags I can bring to my seat?". The interaction engine processes the input, and determines that there are two possible contexts: bags and seats. The interaction engine may then issue the response "I'm not sure what this input is about. Is it about seats or baggage allowance?". The user responds with "baggage allowance". The interaction engine provides the user with an answer regarding baggage allowance.

For the methods illustrated in FIGS. 11 and 12, a safety measure may be implemented to prevent adverse effects to classification functions based on incorrect responses from users. For example, responses may be flagged, and an administrative user may be alerted for human input.

FIG. 13 is a diagram illustrating an exemplary interface 1300 displaying a number of natural language resources used by the hybrid system in various embodiments of the invention. NLI resources may comprise a large assortment of lists and natural language components such as phrases, for example a number of question resources based on phrases such as "how do I . . . " or "what is . . . ", that may then be utilized in recognizing and answering questions from a user. An extended library of language objects may be used to provide the building blocks of natural language, enabling complex recognition of natural language as provided by a user, avoiding common pitfalls associated with virtual assistants that require questions to be asked in a particular way, or only accept a certain number or arrangement of arguments within a question. These natural language resources may then be loaded into a data analytics engine, which automatically identifies concepts, associations, and patterns; and categorizes resources together (for example, based on topic), as described below in FIG. 14. Natural language resources may also be generated synthetically using a generation grammar to increase the stock and variety of available data for the data analytics engine to process.

FIG. 14 is a diagram illustrating groups of NLU resources 1400 based on associations identified by a text-mining module from the data sample in FIG. 13. Filters may be applied to identify groups that are connected, for example by combining groups for "luggage" and "ski" to identify all resources pertaining to "ski luggage". Fuzzy logic may also be implemented to allow grouping of synonyms, for example "luggage" and "baggage". Traditionally, this has generally been a manual process performed line-by-line, but with the use of the data analytics engine, topic modeling may be automated by using machine learning to create sets of metadata tags corresponding to each topic. The discovery and classification process may be repeated many times to produce tagged NLU resource input data, then the classifier may run a variety of tests to determine if it is suitably accurate; for example, generating and answering hypothetical interactions. This results in a hybrid training operation that produces an accurate classifier module and a confidence score that describes how reliable the classification results are.

Figure 15:
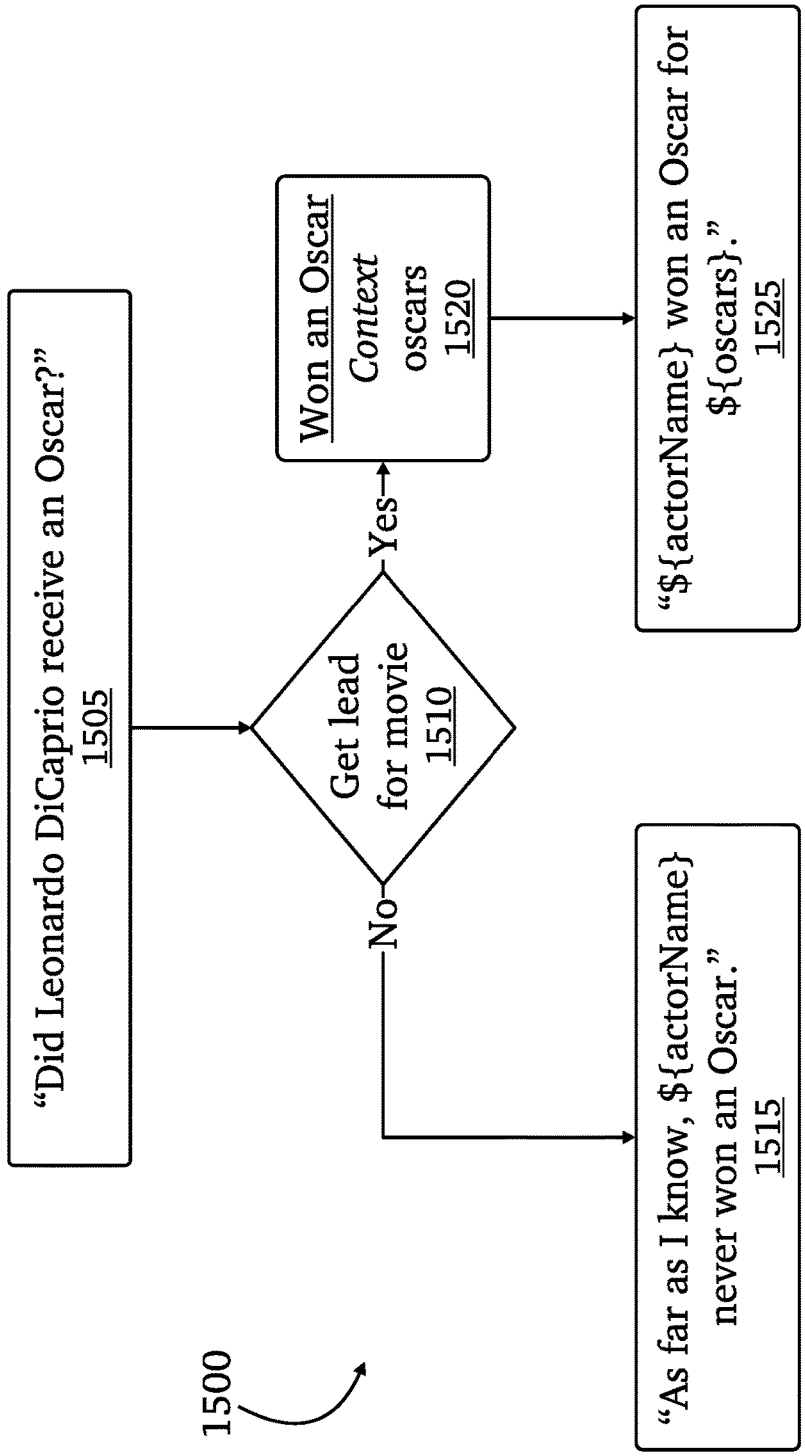
FIG. 15 is a diagram illustrating an exemplary interface for viewing and interacting with a particular language flow as used in various embodiments of the invention.

FIG. 15 is a diagram illustrating an exemplary interface 1500 for viewing and interacting with a particular language flow as used in various embodiments of the invention. At an initial step 1505, a user may ask a question to a chatbot, virtual assistant, or the like. In this example, the user is inquiring whether actor Leonardo DiCaprio has received an Oscar award. The system may parse the speech input, and break it down the input into components. For example, Leonardo DiCaprio may be recognized as an actor's name, and Oscar may be recognized as an award given to outstanding performances by an actor. The overall question may be classified as a question based on movies, and a trigger may be activated that begins a flow that queries a database. At step 1510, the system gets leads for various movies from the database, and another trigger may activate a flow that filters out the movies that do not have Leonardo DiCaprio in the leading role. Each movie may also have awards data associated with it. If no Oscar was awarded to Leonard DiCaprio, a negative results trigger may activate a flow that may cause the system to provide a template response as in step 1515; "As far as I know, ${actorName} never won an Oscar", wherein each of the variables are replaced with the relevant information gathered by the system.

On the other hand, if an Oscar award was awarded, a positive results trigger may activate a flow that may cause the system to store movies into a variable at step 1520, for example ${oscars}. At step 1525, the system may provide the user with a template response; "${actorName} won an Oscar for ${oscars}", wherein each of the variables are replaced with the relevant information by the system.

FIGS. 16A to 16C are diagrams illustrating an active learning interface 1600 within an NLI application development environment as used in various embodiments of the invention. Interface 1600 may comprise listed inputs 1605[a-n], predicted class and scores associated to the inputs 1607[a-n], and control actions for the inputs 1609[a-n]. Interface 1600 may be used for modifying the operation of a classification engine, for example, to alter the rank or priority of classifiers and re-run a classification operation, and then reviewing the updated classification score. This enables immediate response using unstructured data, and can incorporate tagged data from a discovery operation, as well as a trained machine learning model. In the event that the system is unable to classify logged data automatically with available models, and allows human-input to assist the system in being more accurate and with finer granularity.

Inputs 1605[a-n] may be inputs retrieved specially from a log storage using machine learning algorithms that may be pivotal in how an associated NL model is improved, inputs that may be difficult for the system self-classify using available models thereby require, inputs resulting in failed conversations, and the like. Inputs 1605[a-n] may also be associated with other inputs that may be determined through machine learning models, clustering, or text mining to be similar in context and meaning.

Predicted classes 1607[a-n] may be one or more classes predicted by system 105 that the associated input may be in, but uncertain due to the lack of data and available models. Predicted classes 1607[a-n] may, by default, select a predicted class with the highest certainty score, which may be adjusted by a developer. Upon selected the listed class, a submenu 1611 (referring to FIG. 16B) may be displayed and the developer make be presented with additional classification choices.

Inputs 1609[a-n] may be additional actions that the developer may take for each input. Selecting the action icons reveals an action submenu 1613 (referring to FIG. 16C) that may comprise such additional actions as new class, for designating a new class that is was not listed by the system; split inputs, for dealing with incorrectly grouped inputs; and ignore, for removing the input from interface 1600 without any developer input.

It will be appreciated by those having ordinary skill in the art that the degree of "hybridness"—of mixing between language rules built using precise language objects, on the one hand, and machine learning classifiers, on the other—can vary according to aspects of the invention. For example, natural language rules can themselves make use of the machine-learning classifications (that is, within a precise language rule, one or more conditions may make use of classifier results), which would be even more hybrid than having rules' being either precisely defined or machine learning classifiers.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 17:
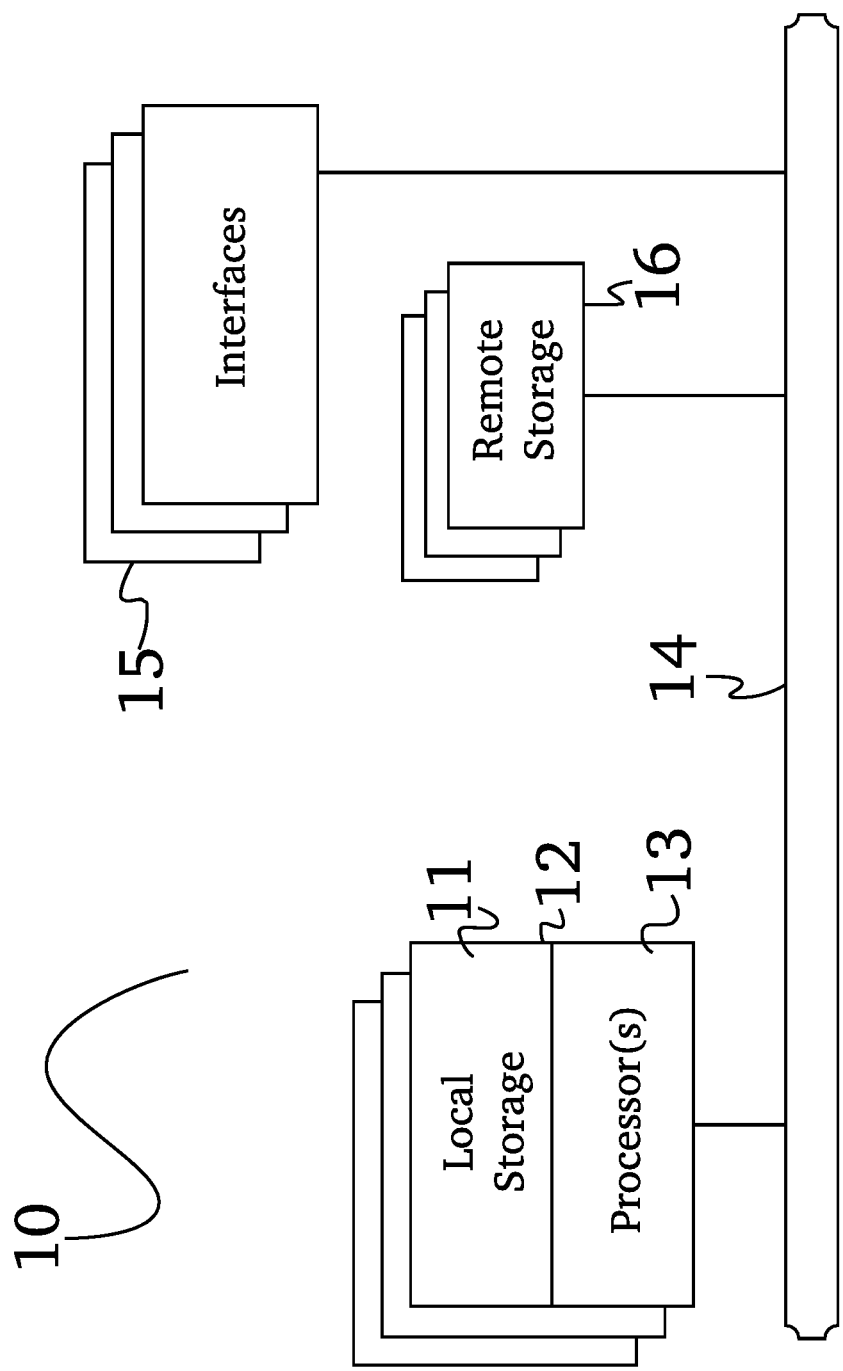
FIG. 17 is a block diagram illustrating an exemplary hardware architecture of a computing device used in various embodiments of the invention.

Referring now to FIG. 17, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 17 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 18:
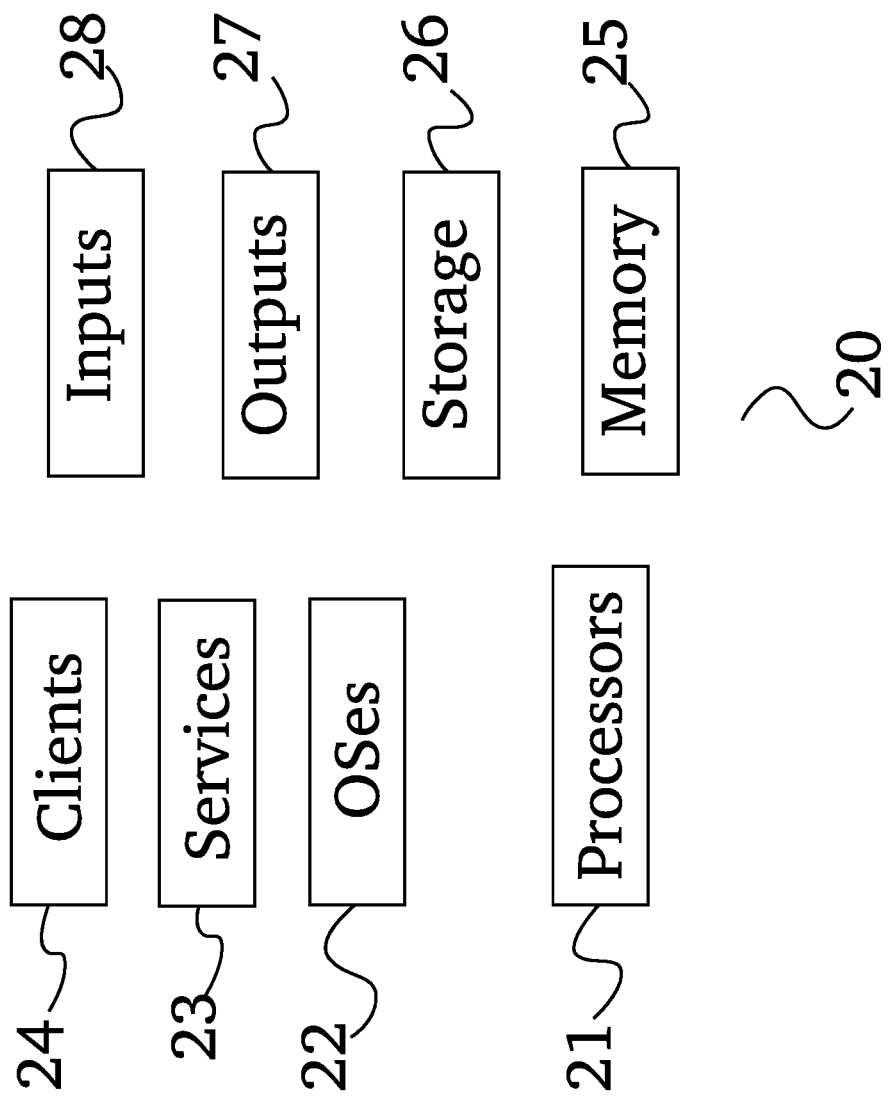
FIG. 18 is a block diagram illustrating an exemplary logical architecture for a client device, according to various embodiments of the invention.

In some aspects, systems may be implemented on a standalone computing system. Referring now to FIG. 18, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 17). Examples of storage devices 26 include flash memory, magnetic hard drive, CD-ROM, and/or the like.

Figure 19:
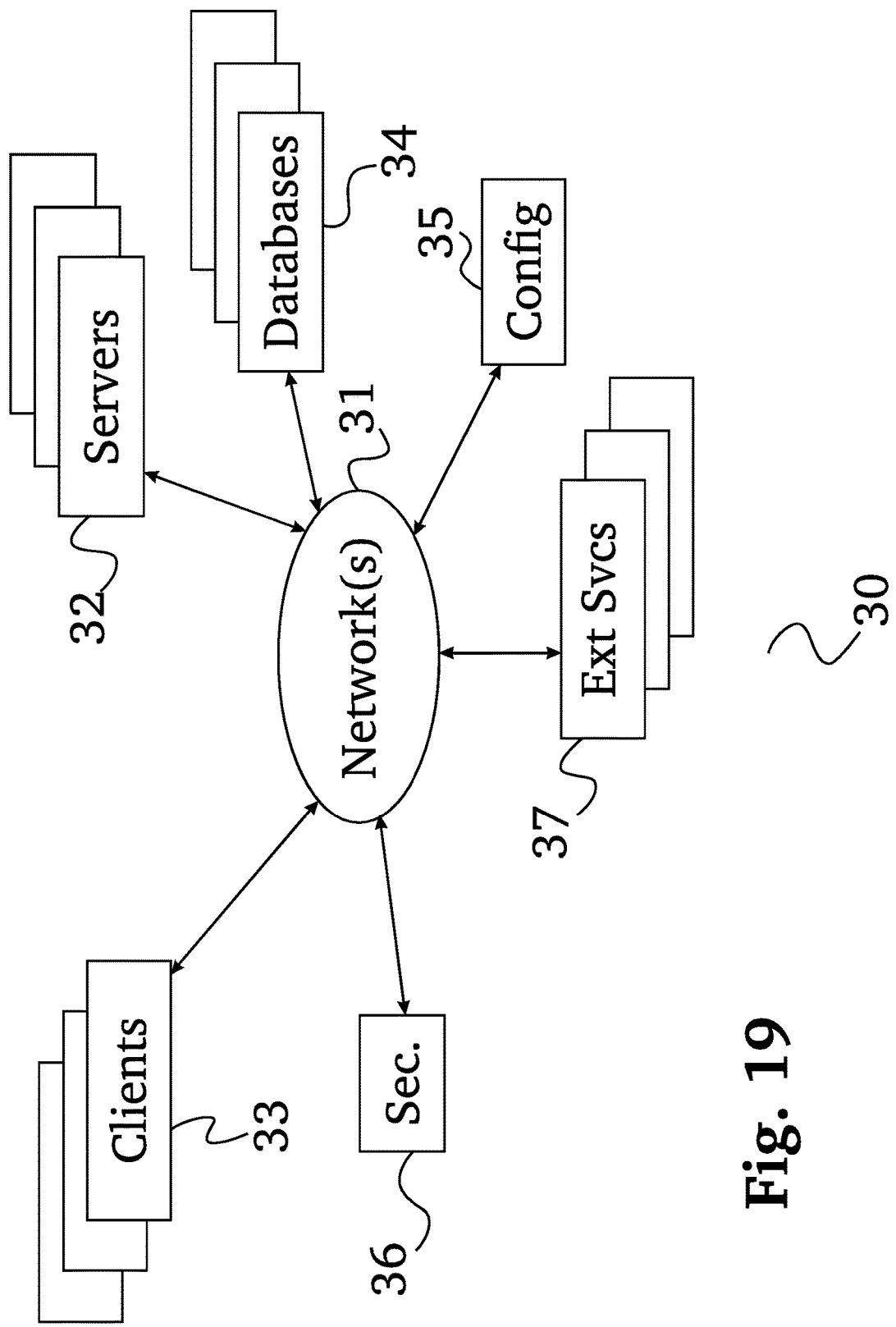
FIG. 19 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 19, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 18. In addition, any number of servers 32 may be provided for handling requests received from one or more clients 33.

Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 20:
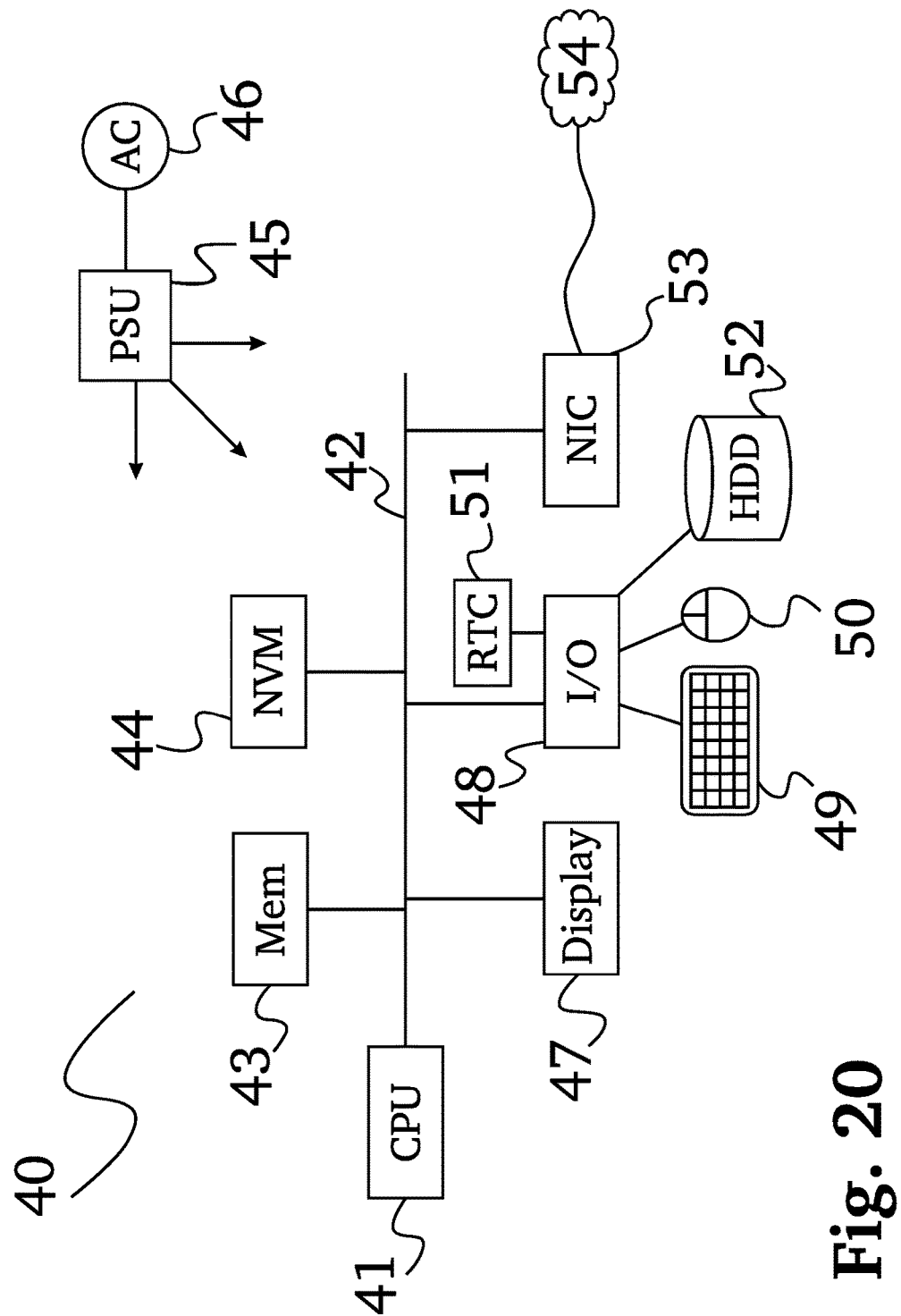
FIG. 20 is another block diagram illustrating an exemplary hardware architecture of a computing device used in various embodiments of the invention.

FIG. 20 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for hybrid approach to natural language understanding, comprising:
   a machine learning service comprising a memory, a processor, and a plurality of programming instructions stored in the memory thereof and operable on the processor thereof, wherein the programmable instructions, when operating on the processor, cause the processor to:
   create a new natural language understanding model based at least in part by a plurality of user-provided examples; and
   provide a natural language understanding model dataset comprising at least the new natural language understanding model to other components of the system;
   an integrated development environment comprising a memory, a processor, and a plurality of programming instructions stored in the memory thereof and operable on the processor thereof, wherein the programmable instructions, when operating on the processor, cause the processor to:
   retrieve the natural language understanding model dataset from the machine learning service; and
   publish a runtime solution by combining at least a natural language understanding rule and a natural language understanding model dataset; and an interaction engine comprising a memory, a processor, and a plurality of programming instructions stored in the memory thereof and operable on the processor thereof, wherein the programmable instructions, when operating on the processor, cause the processor to:
retrieve the runtime solution from the integrated development environment;
receive a natural language input from an external interface;
process the natural language input by at least annotating and classifying the input;
generate a log dataset based at least on how the runtime solution and processed input interprets the natural language input; and
store the natural language input, and log dataset to a log storage;
wherein the processing of the natural language input uses a hybrid solution comprising both natural language rules and machine learning-based classifiers.

2. The system of claim 1, wherein data from the log storage is continuously used by the machine learning service to retrain available models as more interaction data is received.

3. The system of claim 2, wherein the retrained models are used to create an updated runtime solution.

4. The system of claim 1, wherein a new natural language model is automatically created for processing an unfamiliar natural language input based at least on structure of the runtime solution and a plurality of example inputs.

5. The system of claim 1, wherein data from the log storage is processed by the machine learning service to determine data usable for optimizing available natural language rules, and sent to the integrated development environment to optimize available rules.

6. The system of claim 1, wherein data from the log storage is processed by the machine learning service determine data that requires manual labeling, and sent to the integrated development environment for manual labeling.

7. The system of claim 1, wherein data from the log storage is processed by the machine learning service determine data that is usable for a self-learning process, and use the data to automatically retrain available natural language understanding models.

8. The system of claim 1, further comprising a text miner comprising a memory, a processor, and a plurality of programming instructions stored in the memory thereof and operable on the processor thereof, wherein the programmable instructions, when operating on the processor, cause the processor to:
receive historic natural language data from a plurality of sources;
process the natural language data by at least classifying the annotating the natural language data; and
provide the processed language to other components of the system to use in retraining natural language understanding models.

9. The system of claim 1, wherein an order of processing of the runtime solution can be further adjusted and controlled through both human control as well as through machine learning methods.

10. A method for hybrid approach to natural language understanding, comprising the steps of:
(a) creating a new natural language understanding model based at least in part by a plurality of user-provided examples using a machine learning service;
(b) providing a natural language understanding model dataset comprising at least the new natural language understanding model to other components of the system using the machine learning service;
(c) retrieving the natural language understanding model dataset from the machine learning service using an integrated development environment;
(d) publishing a runtime solution by combining at least a natural language understanding rule and a natural language understanding model dataset using an integrated development environment;
(e) retrieving the runtime solution from the integrated development environment using an interaction engine;
(f) receiving a natural language input from an external interface using the interaction engine;
(g) processing the natural language input by at least annotating and classifying the input using the interaction engine;
(h) generating a log dataset based at least on how the runtime solution and processed input interprets the natural language input using the interaction engine;
(i) storing the natural language input, and log dataset to a log storage using the interaction engine;
(j) requesting the log dataset from the log storage using the machine learning service; and
(k) retraining and improve the natural language understanding model dataset using the machine learning service;
wherein the processing of the natural language input uses a hybrid solution comprising both natural language rules and machine learning-based classifiers.

11. The method of claim 10, wherein data from the log storage is continuously used by the machine learning service to retrain available models as more interaction data is received.

12. The system of claim 11, wherein the retrained models are used to create an updated runtime solution.

13. The method of claim 10, wherein a new natural language model is automatically created for processing an unfamiliar natural language input based at least on structure of the runtime solution and a plurality of example inputs.

14. The method of claim 10, wherein data from the log storage is processed by the machine learning service to determine data usable for optimizing available natural language rules, and sent to the integrated development environment to optimize available rules.

15. The method of claim 10, wherein data from the log storage is processed by the machine learning service determine data that requires manual labeling, and sent to the integrated development environment for manual labeling.

16. The method of claim 10, wherein data from the log storage is processed by the machine learning service determine data that is usable for a self-learning process, and use the data to automatically retrain available natural language understanding models.

17. The method of claim 10, further comprising the steps of
(a) receive historic natural language data from a plurality of sources using a text miner; and
(b) process the natural language data by at least classifying the annotating the natural language data using the text miner; and
(c) provide the processed language to other components of the system to use in retraining natural language understanding models using the text miner.

18. The method of claim 10, wherein an order of processing of the runtime solution can be further adjusted and controlled through both human control as well as through machine learning methods.

19. The system of claim 1, wherein at least one natural language rule comprises at least one machine learning classifier as a language condition.

20. The method of claim 10, wherein at least one natural language rule comprises at least one machine learning classifier as a language condition.

* * * * *